(12) United States Patent
Camacho Perez et al.

(10) Patent No.: US 12,500,625 B2
(45) Date of Patent: Dec. 16, 2025

(54) ANTENNA DUPLEXING, WAVEGUIDES, AND METHODS THEREOF

(71) Applicant: Intel Corporation, Santa Clara, CA (US)

(72) Inventors: Jose Rodrigo Camacho Perez, Guadalajara (MX); Debabani Choudhury, Thousand Oaks, CA (US); Timo Sakari Huusari, Hillsboro, OR (US); Seong-Youp John Suh, Portland, OR (US); Shuhei Yamada, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 17/763,208

(22) PCT Filed: Dec. 24, 2019

(86) PCT No.: PCT/US2019/068463
§ 371 (c)(1),
(2) Date: Mar. 24, 2022

(87) PCT Pub. No.: WO2021/133387
PCT Pub. Date: Jul. 1, 2021

(65) Prior Publication Data
US 2022/0337282 A1 Oct. 20, 2022

(51) Int. Cl.
*H04B 1/48* (2006.01)
*H01Q 13/02* (2006.01)

(52) U.S. Cl.
CPC ............... *H04B 1/48* (2013.01); *H01Q 13/02* (2013.01)

(58) Field of Classification Search
CPC ... H04B 1/48; H04B 1/44; H04B 1/18; H04B 1/401; H01Q 13/02; H01Q 13/283
See application file for complete search history.

(56) References Cited

U.S. PATENT DOCUMENTS 6,625,202 B1 * 9/2003 Sudo .................... H04B 1/7115
375/147
9,917,638 B1 3/2018 Bartur et al.
(Continued)

FOREIGN PATENT DOCUMENTS

JP 2002176374 A * 6/2002
JP 2003304106 A 10/2003
(Continued)

OTHER PUBLICATIONS

Zaman et al., "Gap Waveguides", Handbook of Antenna Technologies, Springer Science+Business Media Sigapore, 2016, 201 pages.
(Continued)

*Primary Examiner* — Patrick C Chen
(74) *Attorney, Agent, or Firm* — Viering, Jentschura & Partner mbB

(57) ABSTRACT

A radio frequency front end and an antenna front end may be separated from one another to maintain close proximity between a low noise amplifier and an antenna while achieving improved thermal regulation of a power amplifier. The radio frequency front end and antenna front end may include a duplexing system that enables operation with a single electrical cable. Furthermore, where it is desired to transmit
(Continued)

a radiofrequency signal via a waveguide, a flexible waveguide may be constructed with a distributed capacitance between waveguide protrusions.

11 Claims, 15 Drawing Sheets

(56) References Cited

U.S. PATENT DOCUMENTS

| | | | |
|---|---|---|---|
| 2016/0020737 A1 | 1/2016 | Kong et al. | |
| 2016/0233836 A1 | 8/2016 | Kehrer et al. | |
| 2019/0081596 A1 | 3/2019 | Dunworth et al. | |
| 2020/0176854 A1* | 6/2020 | Jung | H01Q 1/243 |

FOREIGN PATENT DOCUMENTS

| | | |
|---|---|---|
| JP | 2004015472 A | 1/2004 |
| JP | 2004112245 A | 4/2004 |
| JP | 2008311697 A | 12/2008 |
| WO | 2014137776 A1 | 9/2014 |
| WO | 2018128782 A1 | 7/2018 |

OTHER PUBLICATIONS

"Design Guidelines: Liquid Silicone Rubber Molding", retrieved on Mar. 15, 2022, from https://www.protolabs.com/services/injection-molding/liquid-silicone-rubber-molding/designguidelines/, 5 pages.
Simtec, "Liquid Silicone Rubber Injection Molding", retrieved on Mar. 15, 2022, from https://www.simtec-silicone.com/capabilities/liquid-silicone-rubber/, 5 pages.
"Antenna, Waveguide and RF Filter Solutions", etrieved on Mar. 15, 2022, from https://www.cybershieldinc.com/antenna-waveguide/, 2 pages, Cybershield, Inc.
International Search Report for the international application No. PCT/US2019/068463 mailed on Nov. 20, 2020, 5 pages (For reference purposes only).
Extended European Search Report (eESR) issued for the corresponding European patent application No. 19957160.5, dated Jul. 5, 2023, 8 pages (for informational purposes only).
Notice for Reasons for Refusal issued for parallel Japanese patent application No. 2022-520090, dated Dec. 26, 2023, 16 pages (for informational purposes only).
Search Report by Registered Search Organization issued for parallel Japanese patent application No. 2022-520090, dated Dec. 15, 2023, 31 pages (for informational purposes only).

* cited by examiner 1202    1206    1204

1202    1206    1204

1602  1608  1606  1610  1604

1608  1610

1612

ANTENNA DUPLEXING, WAVEGUIDES, AND METHODS THEREOF

CROSS-REFERENCE TO RELATED APPLICATIONS

This application is a national phase under 35 CFR 371 of PCT Application PCT/US2019/068463, which was filed on Dec. 24, 2019, the entirety of which is incorporated herein by reference.

TECHNICAL FIELD

Embodiments described herein generally relate to duplexing configurations between radio frequency front end devices and antenna front end devices, and to waveguides to direct radiofrequency waves.

BACKGROUND

As vehicles incorporate more wireless communication technologies, the requirements for wireless connectivity in vehicles increases. For example, many vehicles are configured for vehicle-to-everything (V2X) applications, including LTE legacy, 5G, and WiFi, etc. These technologies generally require antennas and radio frequency front ends ("RFFE") to be integrated on the surface of a vehicle, such as on the roof, the hood, the trunk, and/or on the side mirrors, etc. These locations can be particularly hostile environments for radio frequency ("RF") electronics and especially to the low-efficiency RF power-amplifiers that require bulky or complex cooling solutions. Moreover, shark-fin and similar assemblies may suffer from a solar-oven effect, which may raise their internal ambient temperature to very high levels under hot and/or sunny conditions. These increased temperatures may significantly degrade performance of the semiconductors within the wireless connectivity equipment.

In addition, the design of the antenna/RFFE must conform with industrial car design practices and/or goals. For example, it is known to separate the antenna front end from the RFFE, such that the RFFE may be housed in a part of the vehicle that is less susceptible to the above solar-oven effect; however, such solutions generally involve multiple cables to connect the RFFE to the various antennas, thereby substantially increasing weight and cost.

Microwave and mmW communications systems for complex platform integration may furthermore require multiple, distributed, interconnecting radio circuits. For example, this may be common in a vehicle, in which radio circuitry must be located in a variety of places within a vehicle and still maintain functional interconnections. Various methods have been attempted for connecting these distributed systems. For example, it is known to use coaxial cables for connection of distributed RF circuitry. Similarly, a variety of waveguides are known for maintaining such distributed RF systems, such as in automobiles. Modern automobiles with advanced RF-systems may be particularly cable-dependent, with complex cable distributions which add significant cost (materials and installation) and weight. These cable bundles may be required to carry any combination of DC-power cables, low-frequency cables, and RF cables.

In certain installations, it may be required to interconnect multiple antennas to distributed TX/RX circuitry, which may be located significant distances from the antennas. For example, it is known in various vehicles to connect antennas to circuitry that is ~1-1.5 m away. Thus, it becomes necessary to utilize a low-loss waveguide. RF/microwave/mmW interconnections running from antennas to radio circuitry must to conform to the vehicle dimensions/surfaces to minimize footprint or the space occupied by them. Moreover, interconnecting distributed radio elements around the vehicle may also require running long DC or low-speed data lines. This increases costs because the interconnecting lines are manufactured and assembled separately.

Known methods of achieving these aims may have various disadvantages. For examples, coaxial cables may have significant insertion losses at RF/microwave and mmWaves. Conventional waveguides and gap waveguides are generally inflexible and poorly suited to the curves and/or bends of vehicles. Corrugated waveguides increase waveguide height to accommodate corrugation, which adds significant bulk, and thus may be disadvantageous. Twisted-pair transmission lines often have high manufacturing cost, low frequency operation, and poor electromagnetic compatibility. DC, low-frequency and RF/mmW Cable Distribution are known to present challenges with radio frequency interference, electromagnetic interference, and other coexistence issues.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

Figure 1:
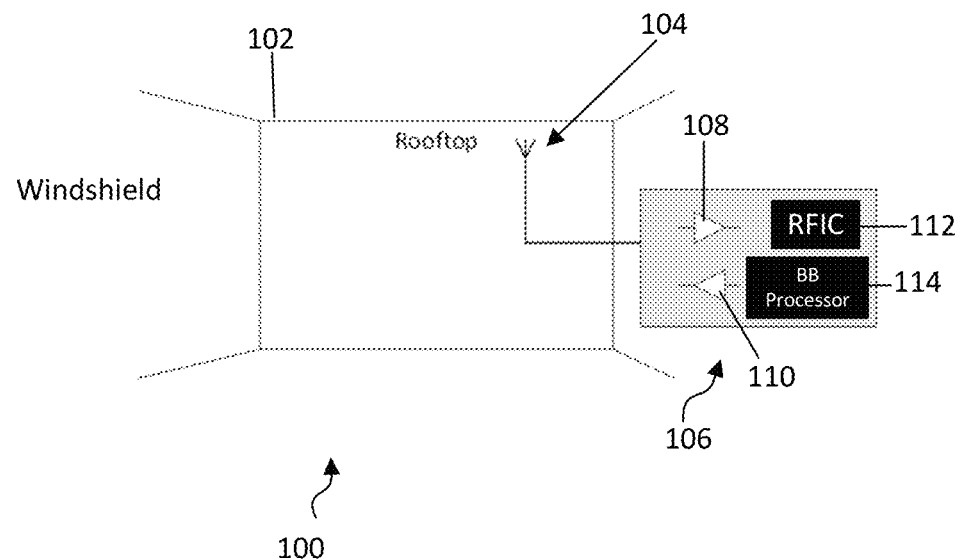
FIG. 1 depicts a known technique for separating the RFFE from the antenna.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and/or electrical changes may be made without departing from the scope of the disclosure. The various aspects of the disclosure are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The term "exemplary" may be used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and in the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. Any type of information, as described herein, may be handled for example via a one or more processors in a suitable way, e.g. as data.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" detailed herein may be understood to include any suitable type of memory or memory device, e.g., a hard disk drive (HDD), a solid-state drive (SSD), a flash memory, etc.

Differences between software and hardware implemented data handling may blur. A processor, controller, and/or circuit detailed herein may be implemented in software, hardware and/or as hybrid implementation including software and hardware.

The term "system" (e.g., a sensor system, a control system, a computing system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

To the extent that the embodiments described herein relate specifically to use in a vehicle, or are described only with respect to vehicle use, the connection to a vehicle is intended to be illustrative and should not be understood to be limiting.

The principles and methods described herein, such as the single-cable connection of a RFFE and an antenna front end, or the connection of waveguides, may have broad application outside of the realm of vehicles. For example, the principles and methods described with respect to single-cable connection of an RFFE and an antenna front end may be applied in a variety of situations, such as where it is desired to separate the RFFE and the antenna front end, due to heat, aesthetics, or for any other reason, or in situations in which it is desired to minimize cable usage. Furthermore, waveguides are frequently discussed in this disclosure as being used in a vehicle. The vehicle as a site of use of the waveguides is employed herein for demonstrative purposes only. The principles, methods, and devices disclosed herein with respect to a waveguide may be applied in a variety of other situations, and therefore the inclusion of a vehicle in the description should not be considered to be limiting.

It is known to separate the RFFE and the AFE such that the antenna front end includes a minimal possible circuit close to antenna such as the LNA and switches, which allowed the electronics to be small and minimizes the required heat load to be able to meet the aesthetic requirements with a small heat sink. However, conventional methods of connecting the antenna front end and the RFFE typically require four cables (power, control and Rx and Tx coaxial cables) per antenna, wherein two of the four cables must generally be coaxial cables. Thus, in a vehicle with four antennas in the roof, at least sixteen cables would be required to connect the four antennas to the RFFE. Such cables account for a significant portion of the weight and expense of modern vehicles, and it is therefore desirable to reduce the number of cables for improved weight (fuel economy etc.) and cost.

In light of the foregoing, it is desired to meet high transmit power requirements with aesthetic antenna design (including antenna front end), provide reliable cooling without the need for a bulky non-aesthetic solution, and to minimize increase in materials costs and the weight of a vehicle.

Herein is disclosed a novel cable and assembly design that reduces the number of cables significantly especially in a car environment which requires a long and complex cable/harness system. Limiting the cables between the antenna front end and the RFFE to one cable may have multiple advantages. First, it may minimize the added weight to the vehicle. Second, it may significantly reduce cost (the cost of cables is significant in vehicle manufacture). Third, it may allow small form-factor, low-heat loads and aesthetic antenna front end design, since no power amplifier ("PA") is required in AFE, and the AFE circuitry is minimized. Reducing the number of cables from four to one can be achieved via a controlled time domain duplexing (TDD) system. Moreover, this TDD system may be ideal for Digital Pre-Distortion (DPD) to further enhance PA linearity and meet strict spectral emission mask requirements (802.11p), since this system permits the PA to be located close to the RFIC. Furthermore, PA and RFIC cooling is simplified, since they can both be located in a less hostile environment compared to a roof-top or shark-fin.

Vehicular communications may require multiple antennas to increase reliability and or support different technologies such as C-V2X, WiFi, GNSS or LTE/5G. FIG. 1 depicts a known technique for separating the RFFE from the antenna 100. As shown in FIG. 1, and at least due to the common omnidirectional coverage requirement, it is often preferred to place the antennas on the roof-top or another outer surface of the car. As shown in this figure, it is known to place the antenna 104 on the rooftop 102, but this method separates from the antenna 104 the RFFE 106. In this case, the RFFE 106 may include a low noise amplifier ("LNA") 108, the power amplifier 110, an integrated circuit 112, and/or a baseband processor 114. It is known to store the RFFE 106 in the shark-fin of the vehicle. This location, however, is very hostile for the electronics, as the rooftop can easily reach temperatures of greater than +50° C., and thus any electronics in a shark-fin or similar assembly may experience very high ambient temperatures even before they are under an electrical load. Moreover, the solar-oven effect raises the temperature inside the shark-fin to even higher temperatures, as there generally is no air circulation within the shark-fin due to the waterproof design requirement. Cooling the RF power amplifier generally requires a bulky cooling solution which is not easily designed to be aesthetic and adds weight to the vehicle. Moreover, this method experiences degraded performance due to the distance between the antenna and the LNA.

Figure 2:
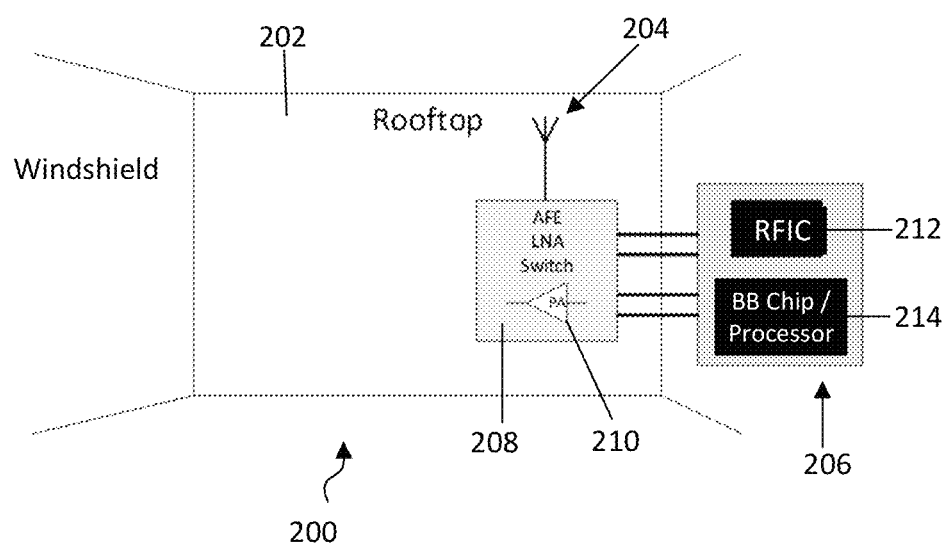
FIG. 2 depicts a known placement of an antenna with close proximity to a low noise amplifier ("LNA") to compensate for a poor noise figure.

FIG. 2 depicts a known placement of the antenna 200 with close proximity to the LNA to compensate for the poor noise figure of FIG. 1 In this example, the rooftop 202 contains at least one antenna 204, which is connected to, and generally in close proximity to the LNA/LNA switch 208 and the power amplifier 210. The RFFE 206 is placed externally to, or in another part of the vehicle with respect to, the AFE 208. The RFFE 206 may include an integrated circuit 212 and/or a baseband processor 214. To correct the degraded performance due to the distance between the antenna and the LNA, it may be preferred to have only the LNA and switches (i.e. the AFE 208) close to the antenna 204 to minimize the noise figure. In this configuration, four cables must generally be run between the RFFE and the AFE. The requirement for four cables represents a substantial increase in cost and weight, which may be undesirable or unacceptable.

Figure 3:
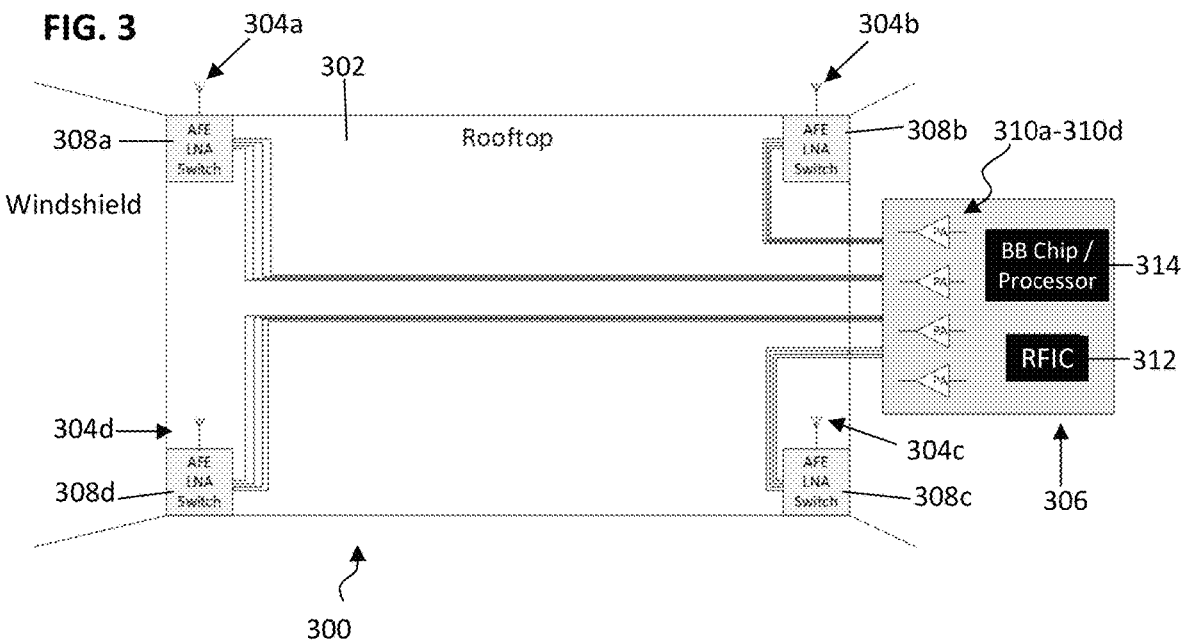
FIG. 3 depicts a known placement with the power amplifier, integrated circuit, and baseband processor located separated from the antennas and LNAs.

FIG. 3 depicts a known placement 300 with the PA, integrated circuit, and baseband processor located separated from the antennas and LNAs. It may be particularly beneficial to have the PA close to the RFIC, as this permits easily coupling of the PA output for digital pre-distortion (DPD) purposes, which is an energy-efficient way to meet strict spectral mask requirements. This may be particularly meaningful for car-to-car communication applications, which operate at the frequency of 5.9 GHz, near WiFi frequencies (for example the strict IEEE 802.11p spectral mask). In this example, the rooftop 302 is configured with a plurality of antennas 304a-304d (i.e., such as in a MIMO installation), wherein each antenna is connected to a corresponding AFE 308a-308d, each including an LNA and a switch. Separate from the AFE, and generally located in another portion of the vehicle, the RFFE 306 may be placed in a location that is thermally advantageous for its semiconductor circuitry. In this case, the RFFE 306 may include a PA for each of the antennas 310a-310d, integrated circuit 312, and a baseband processor 314. As stated above, the conventional connection between the RFFE 306 and the AFE 308 includes two electrical wires and two coaxial cables per antenna. In this simple, four-antenna MIMO installation, sixteen cables/wires are necessary. This represents a significant increase in cost and weight, and may be undesirable or unacceptable.

Figure 4:
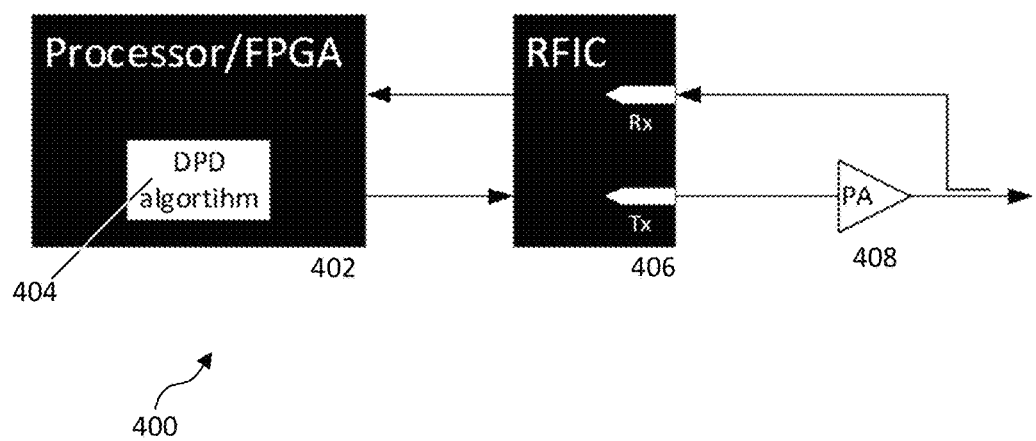
FIG. 4 depicts a digital pre-distortion system 400 that is operated with close physical relationship between the PA and the integrated circuit.

FIG. 4 depicts a DPD system 400 that is operated with close physical relationship between the PA and the integrated circuit. The PA output may be coupled to and received by a digital baseband, where the algorithm finds correct predistortion coefficients which maximize PA linearity. In this example, the processor 402 executes a DPD algorithm 404. The processor 402 is connected to an integrated circuit 406 which is connected to the power amplifier 408. In installations in which the PA is located far from RFIC, an additional cable is required to provide a feedback signal for the DPD algorithm, which thus increases both the weight and materials costs, which may be undesirable or unacceptable.

Figure 5:
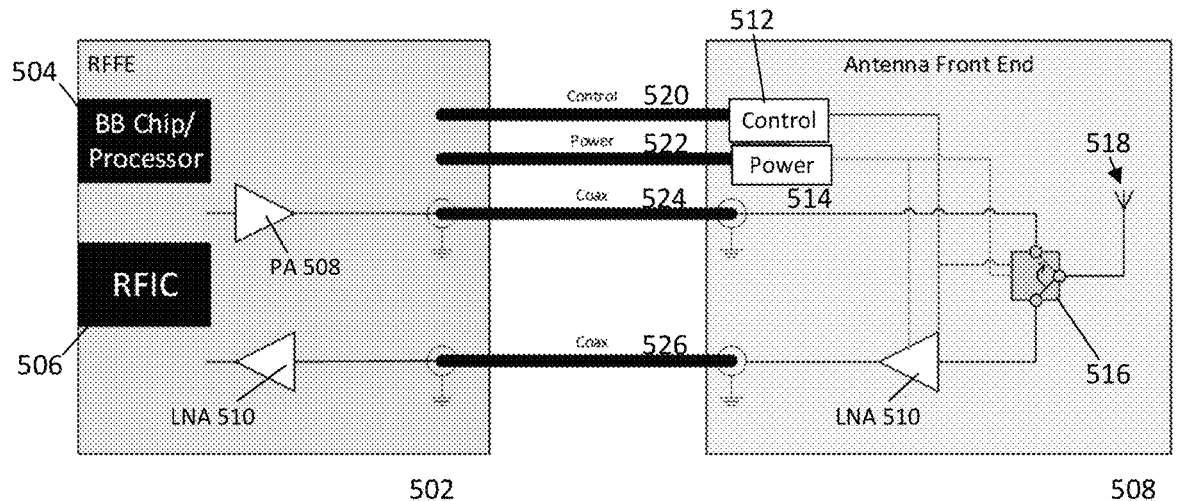
FIG. 5 depicts an RFFE, including a baseband processor, and integrated circuit, a power amplifier, and an LNA.

The conventional solution for connecting the AFE to the RFFE in a time domain duplexing ("TDD") system is to have one receiving ("Rx") coaxial cable, one transmitting ("Tx") coaxial cable, one power cable, and one control cable. The benefit of this solution is that it has the lowest insertion loss for Tx and Rx and fastest control rate due to its dedicated control cable. This conventional solution is depicted in FIG. 5, which shows an RFFE 502, including a baseband processor 504, and integrated circuit 506, a power amplifier 508, and an LNA 510. The RFFE 502 is connected to an AFE 508, which includes an LNA 510, a control circuit 512, the power circuit 514, a switch 516, and an antenna 518. The electrical connections between the RFFE 502 and the AFE 508 are created by four cables, the control cable 520, the power cable 522, the first coaxial cable 524, and the second coaxial cable 526.

As can be seen from FIG. 5, this method requires two expensive coaxial cables and two additional cables (four in total) for each AFE, which quickly increases the materials costs, increases the form-factor of boards due to multiple connectors, and increases the weight of the system, all of which are non-preferred by car manufacturers. This may be particularly true in a MIMO and/or diversity antenna system.

Rather than utilizing four cables for this connection, it is possible to effectively operate the connection between the RFFE and the AFE using only one coaxial cable. This single coaxial cable concurrently or simultaneously carries DC-power, the RF-signal, and the control signal to toggle between Tx and Rx.

Figure 6:
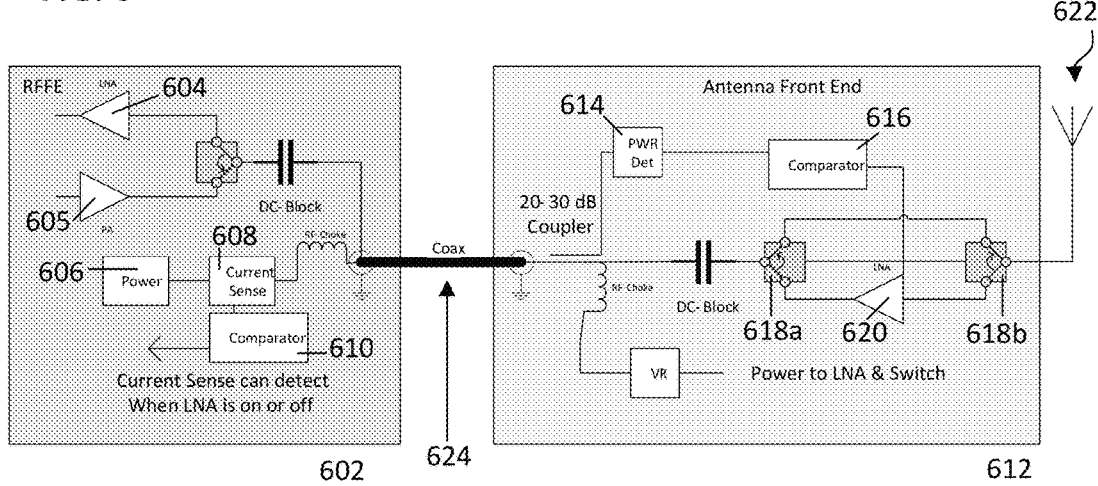
FIG. 6 depicts a connection of a RFFE and an AFE using a single-cable.

FIG. 6 depicts a connection of a RFFE and an AFE using a single-cable, according to an aspect of the disclosure. In this example, the RFFE 602 may include an LNA 604, a PA 605, a power source 606, a current sensing circuit 608, a comparator 610, and integrated circuit (not pictured), and/or a baseband processor (not pictured). The AFE 612 may include a power detector 614, a comparator 616, one or more switches 618a-618b, an LNA 620, and/or and antenna 622. The RFFE 602 is connected to the AFE 612 via a coaxial cable 624.

Both the RFFE 602 and the AFE 612 may be configured to be in Rx mode (e.g., a first operational mode) as a default. That is, the LNA 604 may be active and the switches (connecting 604 and 605, as well as switches 618a and 618b) may be connected to the receiver by pull-ups or pull-downs to maintain default in the first operational mode. When transmission is required, the RFFE 602 and AFE 612 are switched from Rx mode (first operational mode) to Tx mode (second operational mode). This switching of operational modes may occur by changing the RFFE switch (between 604 and 605) to Tx (and thereby disabling the RFFE LNA 604 and enabling the RFFE PA 605). The RFIC may transmit a wake-up signal or operational mode switching signal. The wake-up signal or operational mode switching signal may be any signal that can trigger the following steps. According to one aspect of the disclosure, the wake-up signal or operational mode switching signal may be a carrier signal. The wake-up signal or operational mode switching signal may be constantly or generally constantly transmitted during periods in which the RFFE 602 and AFE 612 should be in the second operational mode. This wake-up signal or operational mode switching signal may be detected by an RF-power detector 614 within the AFE. An output of the RF-power detector 614 may be monitored by a comparator 616, which may toggle switches and disable the AFE LNA 620 when the RF-power is outside of a predetermined power range. It is expressly noted that there may be a variety of techniques available to cause an output of the RF-power detector 614 to disable the AFE LNA 620. The use of a comparator is shown here; however, this is not meant to exclude any other technique that may be utilized by a person skilled in the art. For example, logic gates and/or microprocessors could be utilized to the same effect.

Once the RFFE 602 has switched to the PA 605 and the AFE 612 has disabled the LNA 620, both the AFE 612 and the RFFE 602 are fully ready for high power Tx; however, the baseband (BB) processor (not pictured), in or connected to the RFFE 602, does not know whether AFE is ready. Thus, it is desired to have a procedure for the RFFE 602 to detect whether the AFE 612 is prepared for the second operational mode. For this, it is of particular relevance that the power consumption of the AFE consists mainly of LNA power consumption. As such, disconnecting the AFE LNA 620 is expected to significantly reduce the current draw of the AFE 612. Accordingly, the status of the AFE (and whether it has been successfully prepared for the second operational mode) can be determined by monitoring the AFE's current draw within the RFFE 602. This may be achieved by means of a current sensor 608, which measures the current from the AFE 612. A person skilled in the art will appreciate that the current senor 608 may be connected to the AFE 612 via a RF-choke, which would be expected to predominantly block the RF output of the AFE 612, such that the current sensor 608 measures predominantly the AFE's current demands. Again, a comparator 610 may receive the output of the current sensor 608 and toggle an AFE 612 status bit to the BB-processor, thus indicating to the BB-processor that the AFE 612 has entered the second operational mode and that transmission is now possible. As with the previous use of a comparator, it is expressly contemplated that a variety of implementations may be used to compensate for or replace the comparator 610, such as by using one or more logic gates and/or one or more processors. The reference to a comparator 610 herein is not intended to be limiting.

Whenever transmission is completed, the AFE can be switched back to receive mode and the LNA can be enabled by simply disabling RF-signal (wake-up signal or operational mode switching signal). In so doing, the reverse procedure as that which is described above takes place. Specifically, the power detector 614 may detect that the wake-up signal/operational mode switching signal has been turned off, and the comparator 616 may receive the output of the power detector 614 and may enable the LNA 620 by causing the switches 618a and 618b to flip. With the LNA 620 enabled, the AFE 612 may draw additional current, which may then be sensed by the current sensor 608, which triggers the comparator 610 to inform BB-processor that the current draw is increased as the LNA is enabled (i.e., the device is now ready for reception).

According to one aspect of the disclosure, it may be desirable that the Rx-to-Tx toggling (i.e., switching from a first operational mode to a second operational mode, or vice versa) occurs rapidly. In certain implementations, it may be desirable for this switching to occur in very rapid speeds, such as in less than 16 us.

Figure 7:
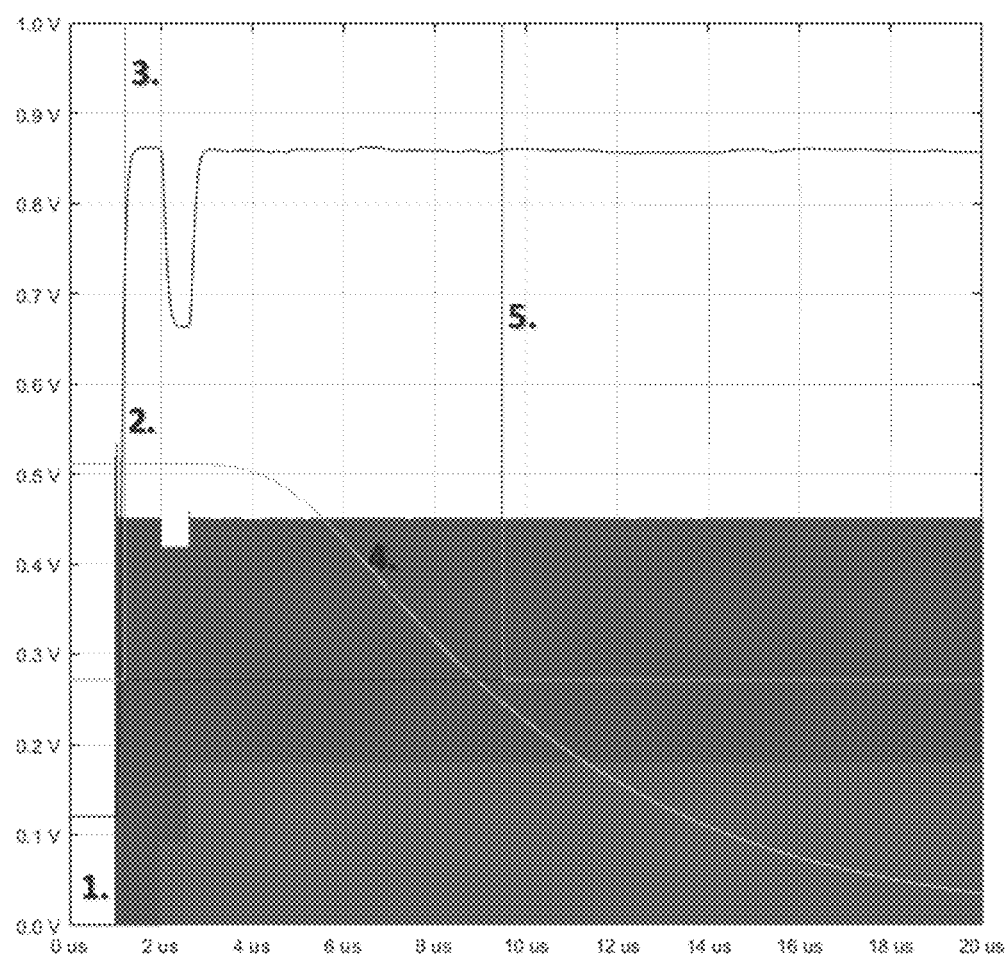
FIG. 7 depicts simulated waveforms of a test of switching times.

Because rapid switching times may be required, it was desired to test the potential switching times of this proposed arrangement. In order to perform this test, a SPICE simulation circuit was built with LTSpice. Active circuits were modeled using Analog Devices/LTC components and the LNA was a voltage controlled switch (used to model its current consumption). FIG. 7 depicts the simulated waveforms of this test.

Turning to FIG. 7, the transition from a first operational mode to a second operational mode begins at ("1"), with a 1 us RFFE switching delay. At ("2"), the RF-power detector begins to output a voltage corresponding to the input power of the AFE. The notch at 2 us is due to reflections that occur when the switches change their state. ("3") depicts the point at which the AFE comparator disables the LNA and switches to the second operational mode. ("4") depicts the measured current beginning to decrease at the RFFE as a result of the LNA having been disconnected. ("5") depicts the AFE current as measured at the RFFE decreasing such that it is outside of a predetermined range, and thus the comparator toggles to inform the baseband processor that the transition to the second operational mode is complete.

The longest delay may be caused by the current measurement, nevertheless, the system can toggle in less than 16 us. Alternatively, the system could be characterized by chosen cable lengths and omit this phase cutting the transition time to approximately 3 us. In general, for fixed systems, it can be measured how long it takes between the initial control signal at the RFFE and the time at which the AFE becomes ready. The AFE may be considered ready when its current begins to decrease. In this case, and since the period of time before AFE readiness is expected to be constant, a timer corresponding to this period of time may be set. At the conclusion of the time, the BB-processor could enable high-power transmission. By utilizing the timer, it may be possible to omit the current sensor in the RFFE. Referring to FIG. 7, the comparator threshold could be set to, for example, 0.5V; however, this may be too close to the steady state current consumption. With the use of the fixed timer described above, the slow current measuring phase may be omitted, and the TX may be enabled more closely to the point where the current is beginning to decrease (i.e., when the AFE is ready to transmit).

In that case, the switching time would be mostly due to the 1 us toggling time of the RF-switches. Power detectors and comparators operate with delays of tens of nanoseconds, causing minimal delays in the 16 us budget. While this simulation was fully analog, alternatively, the comparator could be a low power microcontroller with built-in comparator if additional functionality was required at the AFE such as minimum time spent at Tx or Rx mode.

Additionally, the impact on the RF-performance was analyzed. For an RF-optimized case, there would normally be dedicated cables for Tx and Rx to minimize insertion losses, such as depicted in FIG. 5. Comparing the electrical connections (e.g., the 4 cables) to those of FIG. 6, the single-cable systems may be implemented using two additional switches and a coupler in the signal path.

This configuration may have a minimal impact on the noise figure, since the LNA may be very close to the antenna in the configurations depicted in both FIG. 5 and FIG. 6. A single-cable system appears to have a larger effect on PA requirements, as the two additional switches and a coupler tend to cause additional insertion loss which must be compensated for.

Additionally, and according to another aspect of the disclosure, it may be desirable that the required coupler has a low coupling such as 20 dB or 30 dB and thus would have a very low theoretical insertion loss. Couplers of these coupling values mostly have losses due to practical implementation and could be assumed to be less than 0.5 dB. The added insertion loss due to single cable solution compared to multiple cables is thus 1.5 dB up to 6 GHz or even less, depending mainly on the switch performance and operating frequency. While not negligible, it can be compensated for by increasing PA-output power-especially considering that the PA is now located in a place where cooling can be arranged conveniently.

According to another aspect of the disclosure, and with respect to vehicle installation, it may be desirable to have the RFFE, RFIC, and baseband processor inside an enclosure, for example, the headliner, the trunk or the dashboard. This may minimize the length and insertion loss of the required coaxial cables to the multiple AFEs. Further, using the single-cable connection described herein, only one cable per antenna is required, which limits the cable-burden of separating the RFFE from the AFE. Given the challenges of temperature regulation for the PA, it is noted that a module located inside headliner and/or dashboard may be able to leverage cabin air conditioning for cooling. This architecture and single-cable solution may provide advantages in terms of system performance and efficiency by reducing the number of cables, relaxing thermal requirements, reducing materials costs, etc. The impact may be magnified in MIMO/diversity antenna systems, in which the reduction from four cables to one cable per antenna is realized over a plurality of antennas.

Figure 8:
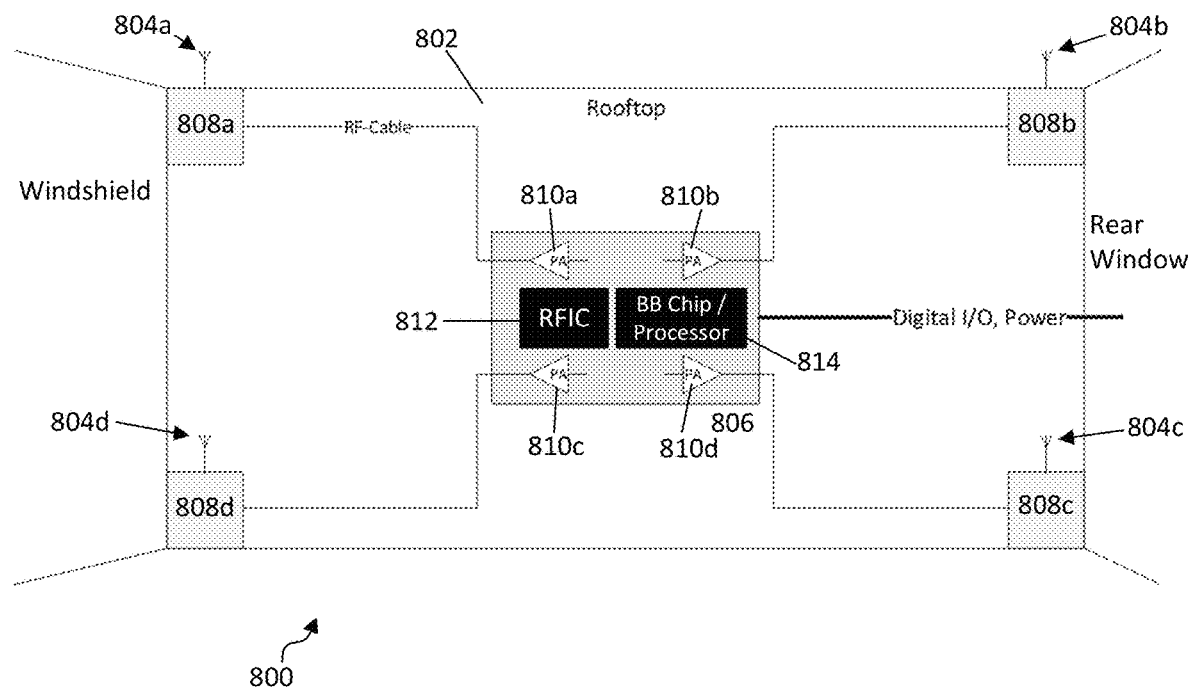
FIG. 8 depicts a single-cable installation with multiple antennas, according to an aspect of the disclosure.

FIG. 8 depicts a single-cable installation with multiple antennas 800, according to an aspect of the disclosure. In this figure, four antennas (such as in a MIMO installation) are installed within the rooftop 802 of the vehicle. These are depicted herein as antennas 804a-804d, which are connected to AFE 808a-808d, respectively, each of which are connected to the RFFE 806. With the RFFE 806, there are four PA 810a-810d, each of which are connected to one of the antennas. A single RF-cable connects the RFFE 806 to each of the AFEs 808a-808d.

Figure 9:
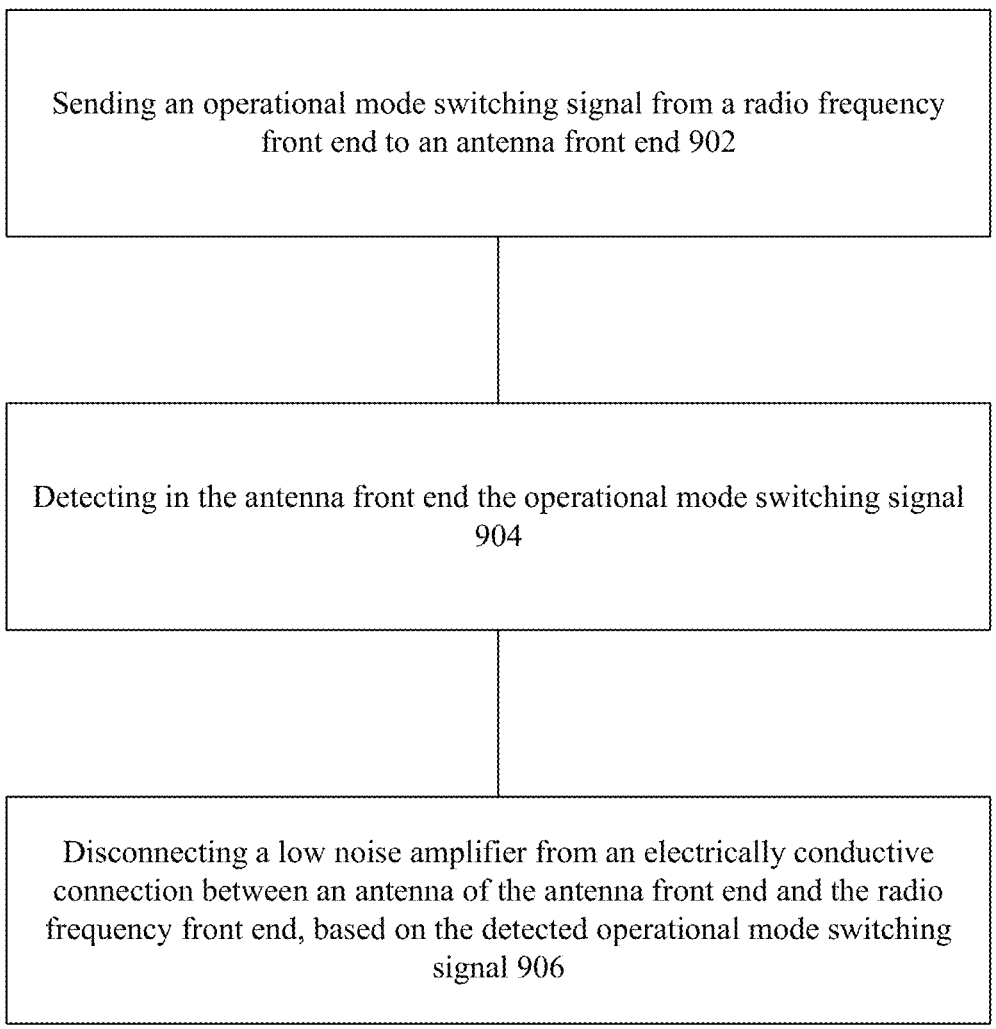
FIG. 9 depicts a method of antenna duplexing.

FIG. 9 depicts a method of duplexing including sending an operational mode switching signal from a radio frequency front end to an antenna front end 902; detecting in the antenna front end the operational mode switching signal 904; and disconnecting a low noise amplifier from an electrically conductive connection between an antenna of the antenna front end and the radio frequency front end, based on the detected operational mode switching signal 906.

As described herein, both the RFFE and the AFE may be configured to operate according to either of a first operational mode or a second operational mode. The first operational mode may be understood for the purposes herein as a receive mode, and the second operational mode may be understood as a transmission mode. The RFFE and the AFE may be configured to default to either the first operational mode or the second operational mode. In the examples disclosed herein, the RFFE and the AFE are defaulted to the first operational mode (i.e. reception mode). This default can be achieved by means of a pullup or pulldown circuit.

Although the examples disclosed herein specifically relate to a default of the first operational mode, the RFFE and the AFE may alternatively be arranged to default to the second operational mode. That is, the RFFE and the AFE may be configured with a pullup or pulldown circuit such that they default in transmission mode. According to this configuration, the operational switching signal of the processor in the RFFE would cause the power detector of the AFE and its connected comparator to engage the LNA of the AFE. The increased current draw triggered by the engagement of the LNA would be detected by the current sensing circuit in the RFFE which, in connection with the comparator, would inform the processor that the first operational mode has been entered.

The RFFE and the AFE may be configured such that the operational mode switching signal of the RFFE causes the operational mode to change from the first operational mode to the second operational mode, and further that pausing the operational mode switching signal of the RFFE causes the RFFE and the AFE to switch from the second operational mode to the first operational mode. That is, pausing the operational mode switching signal causes the RFFE and the AFE to revert to their default operational mode state.

To the extent that any specific parameters have been referenced herein with respect to any of the components of the switching circuits (e.g. LNAs, PAs, current sensing circuits, power detectors, comparators, switches, or the like), it is expressly anticipated that the specifications of these components may be selected and/or adapted to a particular installation. That is, many of the components must be configured relative to the other components and the needs of the installation. For example, the current sensing circuit/current sensor must be selected to sensor current that corresponds to the current usage of the LNA in the AFE. Similarly, the power detector of the AFE must be selected to correspond to the operational mode switching signal of the RFFE, and vice versa.

In the methods and procedures disclosed herein, the LNA of the AFE may be engaged or disengaged from the system by means of two switches (depicted in FIGS. 6 as 618*a* and 618*b*). Although such switches may be a convenient means to achieve the same, it is contemplated that other methods of electrically conductively connecting the LNA within the conductive path between the antenna and the RFFE may be employed. The person skilled in the art will appreciate a variety of circuitry or implementation techniques for the same, and the use of two switches is not intended to be limiting in this matter.

According to an aspect of the disclosure, the RFFE may include a switch to selectively connect either an LNA or a PA within the RFFE to the electrical path with the antenna. In this case, it is anticipated that the switch will selectively connect to the LNA for reception (the first operational mode) and will selectively connect to the PA for transmission (second operational mode). The switch may be operated by any means which is capable of toggling the switch for the changes between operational modes. According to one aspect of the disclosure, the one or more processors of the RFFE may be utilized to operate the switch for the changing between operational modes along with the generation of the operational mode switching signal.

The methods and principles described herein are designed to be implementable with a single electrically conductive connection between the RFFE and the AFE (i.e., a single coaxial cable). The use of the single coaxial cable permits reduced complexity of implementation, reduced weight, and reduced materials costs.

The RFFE and the AFE may be implemented together or separately. That is, although certain aspects of the RFFE and the AFE must be configured to operate with one another (e.g., the sensor in the AFE must be configured to recognize the operational mode switching signal of the RFFE), the RFFE and the AFE may be manufactured, sold, and/or distributed independently of one another. As such, the RFFE and the AFE may each be considered independent devices.

According to another aspect of the disclosure, a method of antenna duplexing may include sending an operational mode switching signal from a first radiofrequency device to a second radiofrequency device; disconnecting a low noise amplifier from an electrically conductive connection between the first radiofrequency device and an antenna of the second radiofrequency device; detecting a change in current drawn by the second radiofrequency device, as a result of disconnecting the low noise amplifier; and changing from a first operational mode to a second operational mode based on the detected change in current.

The principles and methods described herein may be performed as part of a non-transient computer readable medium, including a plurality of instructions which, when implemented, cause one or more processors to perform the methods disclosed herein.

Waveguides may be used to connect distributed radiofrequency components. Waveguides are currently used in a variety of vehicle applications, such as in situations where radiofrequency components and antennas are physically separated from one another. Many implementations, however, require placement of waveguides in environments with curves or bends, and conventional waveguides may be undesirable or unsuitable for these implementations. Conventional waveguides may be very rigid and unable to accommodate curves or bends for a given implementation. This may be particular true in the context of a vehicle.

Herein is disclosed a flexible waveguide structure, which may be particularly well-suited for environments requiring curves or bends. The flexible waveguide structure may include sidewalls realized by an artificial electric conductor consisting of double interlacing conducting ridged walls or conducting bed of nails or posts. The interspacing between the nails or ridges may enable mechanical flexibility to conform with curved surfaces. This new type of waveguide realization also enables bundling together DC or low speed or RF and microwave signals by creating an absence of nails, posts and spaces within ridge walls.

The waveguide structure described herein provides low insertion loss, along with current rectangular and square waveguides. It offers mechanical flexibility to conform to an implementation space, such as the spatial requirements of a vehicle. It has a low footprint, meaning that the waveguide height is not generally increased, compared to corrugated waveguides that use ridges that protrude at the exterior faces. It has a relaxed assembly tolerance, such that it can provide for gaps in its lateral walls.

The flexible waveguide disclosed herein may accommodate DC, low-frequency, and/or RF/microwave/mmW cables, which can be placed through the opening layouts between interlaced top/bottom grounded nails and/or within side walls of the top and bottom parts of the waveguide.

According to one aspect of the disclosure, the flexible waveguide may include side-walls made from an electric conductor consisting of double bed of metal or metallized nails, posts or ridged structures. The double bed of nails or ridges may be configured to come together in close proximity, such that some of the nails or ridges of a first side come into contact with some of the nails or ridges of the second side, but that some of the nails or ridges of the first side do not come into contact with any of the nails or ridges of the second side.

The fact that some of the nails or ridges of the first side may not come into contact with any of the nails or ridges of the second side creates a flexibility in the waveguide, which may be utilized to accommodate bends or curves in an implementation. That is, the small space available between the metallized nails, posts or ridges of the waveguide walls may enable the waveguide to flex without impact to its performance.

By virtue of its overlapping nails or ridges, the proposed waveguide may be assembled by pressing together the top and bottom sections. As stated above, some of the nails or ridges of the first side would be expected to make physical contact with some of the nails or ridges of the second side. This physical contact creates friction which holds the two pieces together. The friction between interlacing of nails and ridges after conforming provides a stable union so no soldering is required and possibly no fasteners. In addition, some of the nails or ridges of the first side do not come in contact with any of the nails or ridges of the second side. This can be used advantageously to create a capacitive shielding effect.

According to another aspect of the disclosure, the flexible waveguide may offer shielding for DC/low speed electrical wires/cables. Wires/cables carrying DC or low-speed data signals can be routed within the artificial electrical conductors of the waveguide disclosed herein for improved resilience to electromagnetic interference and reduced unwanted radiated emissions.

According to another aspect of the disclosure, the flexible waveguide may provide an electrical wiring harness, which may house/combine RF/microwave/mmW waveguide and/or DC/low speed transmission lines. This flexible waveguide may offer the benefits of a flexible/bendable waveguide and a DC/low speed line shielding into an electrical wiring harness capable of carrying microwave waveguides and DC/low speed signals. Furthermore, the mechanics of assembly may be simplified compared to various conventional waveguides.

According to another aspect of the disclosure, the flexible waveguide may be configured into a horn-type antenna with ridged side walls or side walls constructed of double beds of nails or ridges.

According to an aspect of the disclosure, the flexible waveguide may be characterized by a double bed of nails or ridged structures that interlace with another to form an artificial conductor. Such a conductor is used to replace the walls in waveguides or waveguide based-type antennas and to shield DC lines.

Figure 10:
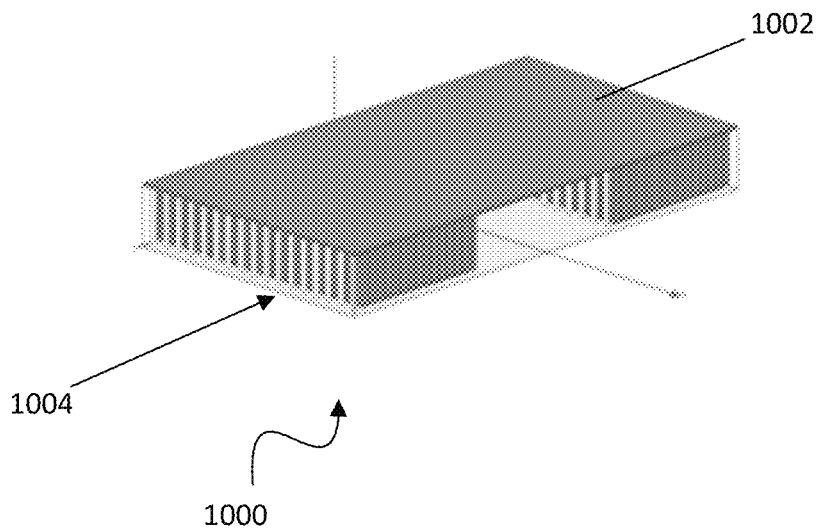
FIG. 10 depicts a first waveguide unit and a second waveguide unit in an assembled state.

FIG. 10 depicts a flexible waveguide 1000, according to an aspect of the disclosure. The flexible waveguide may include a first waveguide unit 1002 and a second waveguide unit 1004. The first waveguide unit may include a first substrate. The first substrate may be generally flat, being principally characterized by a first side and a second side opposite the first side. The first substrate may have a plurality of protrusions extending from the first side and/or the second side. The plurality of protrusions may be any of a variety of shapes, including, but not limited to, nail-shaped, finger-shaped, ridge-shaped, any combination thereof, or otherwise. The protrusions may be characterized by a length extending at an angle from the substrate. According to an aspect of the disclosure, the protrusions may extend approximately perpendicularly from the substrate. The protrusions from the first substrate and the second substrate may be sized and/or arranged such that they can be fit together. That is, the first waveguide unit and the second waveguide unit may be assembled by pressing the protrusions from the first waveguide unit and the protrusions from the second waveguide unit together, and then further pressing such that the protrusions from the units interleave one another. According to an aspect of the disclosure, the protrusions may be configured such that some protrusions from a first waveguide unit make physical contact with one or more protrusions from a second waveguide unit when the waveguide units are assembled (i.e., pressed together to interleave the protrusions). This physical contact results in friction that may hold the first waveguide unit and the second waveguide unit together, whether without the need for an additional fastener or as a supplement to one or more fasteners. The friction may be a result of any of the size of the protrusions, the quantity of protrusions, the number of protrusions that make contact with other protrusions, the tightness of a fit among the protrusions (i.e., how much force they exert on one another), the material of the protrusions, a coefficient of friction of the material of the protrusions, or any combination thereof.

Figure 11:
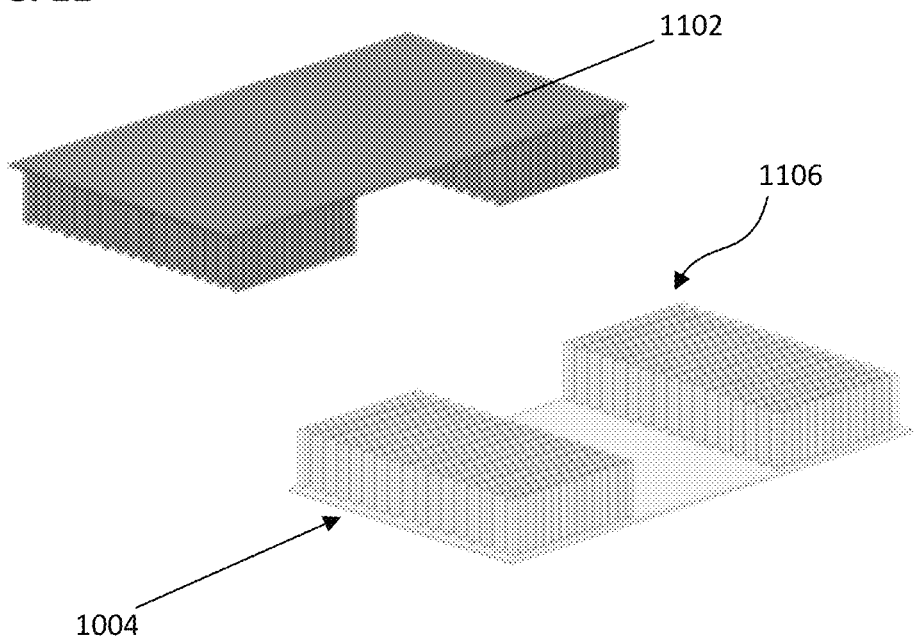
FIG. 11 depicts a first waveguide unit and a second waveguide unit in an unassembled state.

FIG. 11 depicts the first waveguide unit 1102 and the second waveguide unit 1104 in an unassembled state. From this view, the protrusions of each of the waveguide units are readily visible. In this figure, the waveguide units are depicted as having nail-like protrusions or finger-like protrusions 1106.

Figure 12A:
FIG. 12A depicts a side-view of a waveguide, according to an aspect of the disclosure.

FIG. 12A depicts a side-view of the waveguide. In this view, the protrusions of the first waveguide unit and the protrusions of the second waveguide unit are readily apparent. The protrusions are depicted as being interleaved within one another. In this figure, the protrusions are depicted such that, in an assembled state, they alternate with one another.

According to one aspect of the disclosure, the protrusions of the first waveguide unit and the protrusions of the second waveguide unit may be similarly spaced on their relative substrates. In this manner, the protrusions of each substrate may have a generally uniform distance from one another, said distance being approximately the width of the protrusions on the opposite substrate. In this manner, the two waveguide units may be assembled together in such a way that the protrusions interleave, and that some protrusions make physical contact with one another and that other protrusions do not make physical contact with any other protrusions.

Figure 12B:
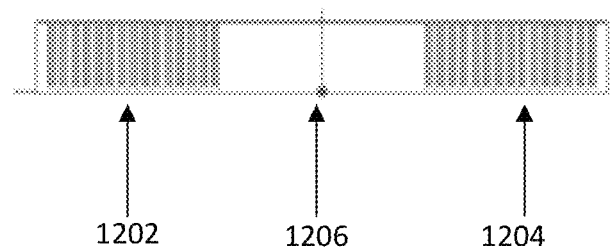
FIG. 12B depicts a front-view of a waveguide, according to an aspect of the disclosure.

FIG. 12B depicts a front-view of the waveguide, showing an inner region of the first waveguide unit and the second waveguide unit, the inner region having no protrusions. Each waveguide unit may include three sections along its surface from which the protrusions extend: two outer regions 1202 and 1204 and an inner region 1206 between the two outer regions 1202 and 1204. The outer regions 1202 and 1204 may include the protrusions as described throughout. The inner region 1206 may include no protrusions or may include protrusions that are shorter than the protrusions of the outer regions. The inner region of the first substrate and the inner region of the second substrate may generally correspond to one another, such that, when the waveguide is assembled, the inner regions of the first substrate and the second substrate form an opening as depicted in FIG. 12B. This opening forms the channel through which the waves are directed.

Figure 12C:
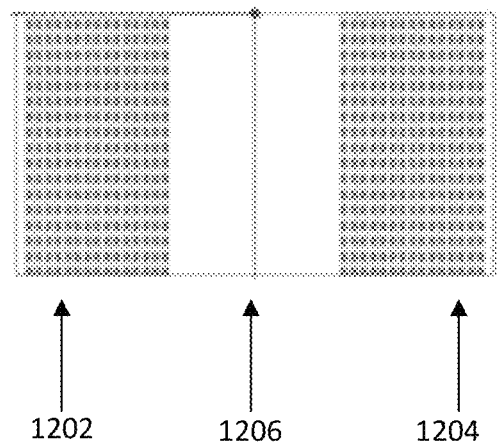
FIG. 12C depicts the first waveguide unit or the second waveguide unit, as seen from the inner side, according to an aspect of the disclosure.

FIG. 12C depicts either the first waveguide unit or the second waveguide unit, as seen from the inner side (i.e., the side that includes the protrusions). In this figure, the outer regions 1202 and 1204 are present, as well as the inner region 1206 between the outer regions 1202 and 1204.

Figure 13:
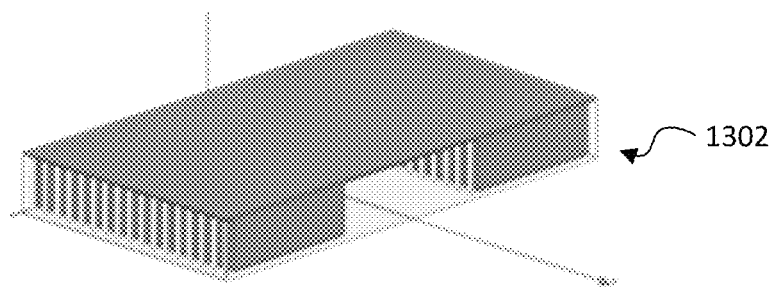
FIG. 13 depicts a waveguide according to another aspect of the disclosure.

FIG. 13 depicts a waveguide according to another aspect of the disclosure. In this figure, the waveguide includes a plurality of ridge-shaped protrusions 1302, as opposed to the nail-shaped protrusions of the prior examples. The ridge-shaped protrusions may be in any direction, whether lengthwise, widthwise, oblique, or otherwise. In this example, the ridges run from an outer side of the waveguide unit to the inner region. The protrusions may be layered, such that a ridge protrusion is followed by a space (i.e., essentially a relief of a protrusion), which is followed by a protrusion, etc. The protrusions of one waveform unit may be configured to fit within the reliefs of the other waveform unit, and vice versa. The protrusions and reliefs may be configured such that, when the first waveform unit and the second waveform unit are assembled, some of the protrusions of the first waveform unit make physical contact with some of the protrusions of the second waveform unit, and some of the protrusions of the first waveform unit do not make physical contact with any of the protrusions of the second waveform unit.

Figure 14:
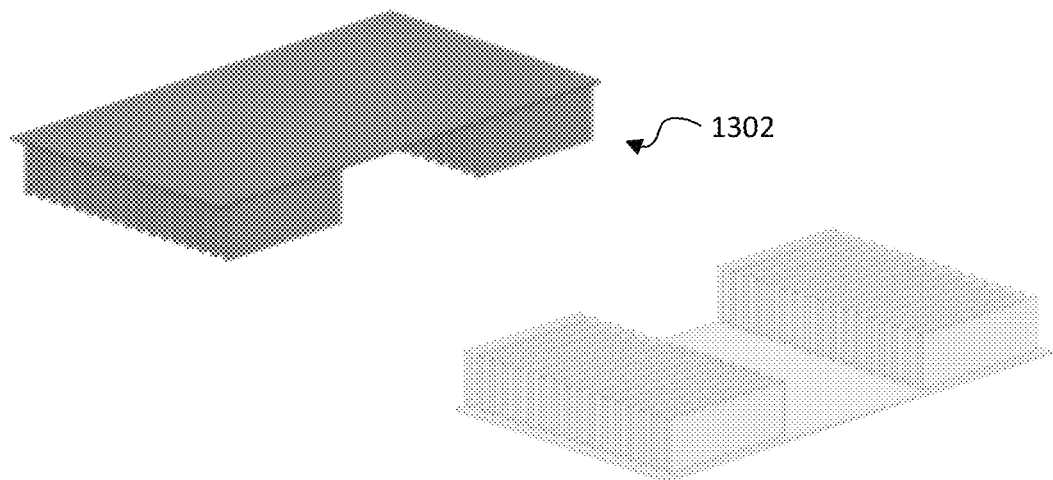
FIG. 14 depicts the waveguide units of FIG. 13, separated from one another.

FIG. 14 depicts the waveguide units of FIG. 13, separated from one another. In this view, the ridge shaped protrusions are plainer to see. The inner region of the first waveguide unit and the second waveguide unit, in which no protrusions are present (or at least where any protrusions are shorter than those in the outer regions) are visible.

Figure 15A:
FIG. 15A shows a side view of the waveguide of FIG. 14, when assembled.
Figure 15B:
FIG. 15B shows a front view of the waveguide of FIG. 14, when assembled.
Figure 15C:
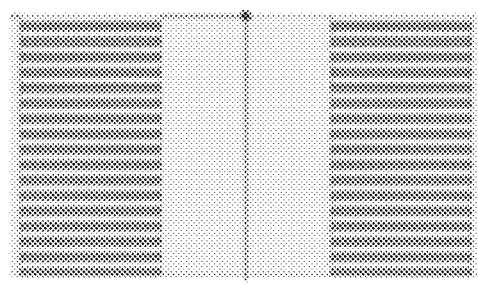
FIG. 15C shows a top view of a waveguide unit as depicted in FIG. 14.

FIG. 15A shows a side view of the assembled waveguide of FIG. 14. FIG. 15B shows a front view of the assembled waveguide of FIG. 14. In this figure, the presence of ridges (rather than nails) is shown by means of the solid ridge protrusions that extend unbroken from an outer edge of the waveguide unit to the inner region of the waveguide unit. FIG. 15C shows a top view of a waveguide unit as depicted in FIG. 14. The ridge-shaped protrusions are again depicted as being unbroken from the outer edge of the waveguide unit to the inner region.

Two types of protrusions are depicted herein: nail protrusions and ridge protrusions. Although the ridge protrusions are depicted in the figures as being unbroken from an outer edge of the waveguide unit to the inner region, this is not necessary. The term "ridge" is used to indicate that the protrusions have an increased width compared to the nail-protrusions. It is conceivable that a waveguide unit can be constructed with two or more ridges for each row of ridges depicted in FIG. 15C. The waveguide protrusions (whether nails, fingers, ridges, or otherwise) may be in any shape whatsoever, including, but not limited to rectangles, cylinders, spheres, arches, polygons, or any other shape.

Figure 16A:
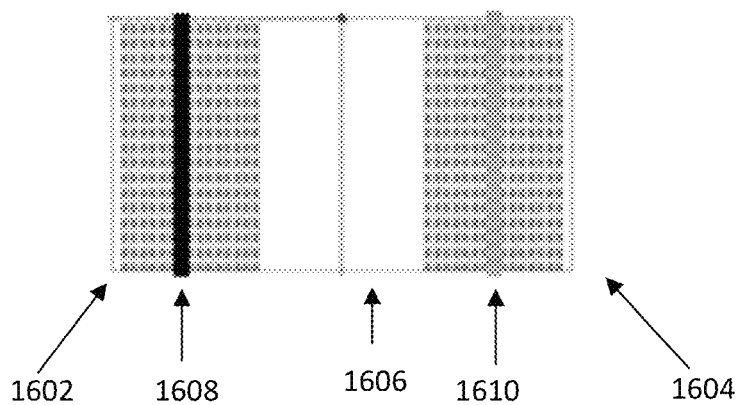
FIG. 16A depicts a waveguide being further configured to accommodate a DC power line, according to another aspect of the disclosure.

FIG. 16A depicts a waveguide being further configured to accommodate a DC power line, according to another aspect of the disclosure. Specifically, this figure depicts a waveguide including a first outer region 1602, a second outer region 1604, and an inner region 1606. The first outer region 1602 and the second outer region 1604 include a wiring harness groove 1608 and 1610, in which either no protrusions are present or in which the protrusions are shorter than the adjacent protrusions in the first outer region and the second outer region. This difference in protrusion size (or absence of protrusions) creates a groove which can accommodate DC wire. This permits simple organization of the DC wires using the waveguide and thus eliminates or reduces the need for an additional wiring harness. Some applications require simultaneous or concurrent use of both DC lines (e.g., low speed lines) and microwaves. The DC lines generally require shielding, and this shielding is conventionally provided by means of a shield around twisted pairs of DC wires. In conventional installations, the shielded wires are arranged separately from the waveguide, thereby requiring a separate wiring harness or other device to organize or arranged the wires. According to an aspect of the disclosure, the waveguide disclosed herein can be configured to accommodate or house DC wires, thereby reducing or eliminating the need for a separate wiring harness. In addition to providing a harness or organizational structure for the wires, the distributed capacitive effect of the device effectively realize an artificial electric conductor that shields wires placed within the wire housing 1602 and 1604. Although two wire housings are depicted in this example, the number of wire housings in the waveguide may be greater or fewer, as desired.

Figure 16B:
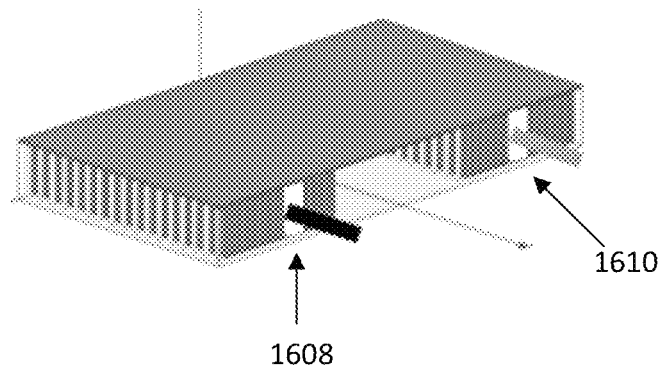
FIG. 16B shows an assembled waveguide with additional wiring harness grooves.
Figure 16C:
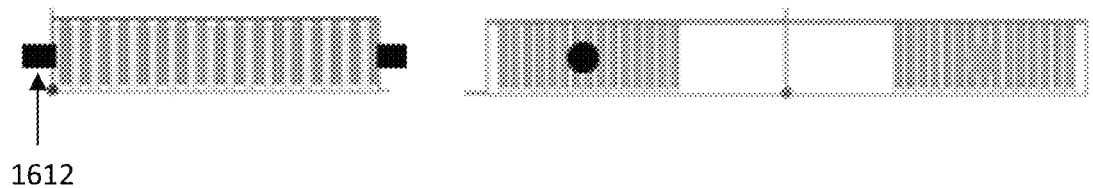
FIG. 16C shows side views of the waveguide in which a wire is running laterally through the waveguide.

FIG. 16B shows an assembled waveguide with additional wiring harness grooves 1608 and 1610. FIG. 16C shows side views of the waveguide in which a wire is running laterally through the waveguide, as depicted 1612; and in which wires are running front to back through the waveguide 1614.

Figure 17:
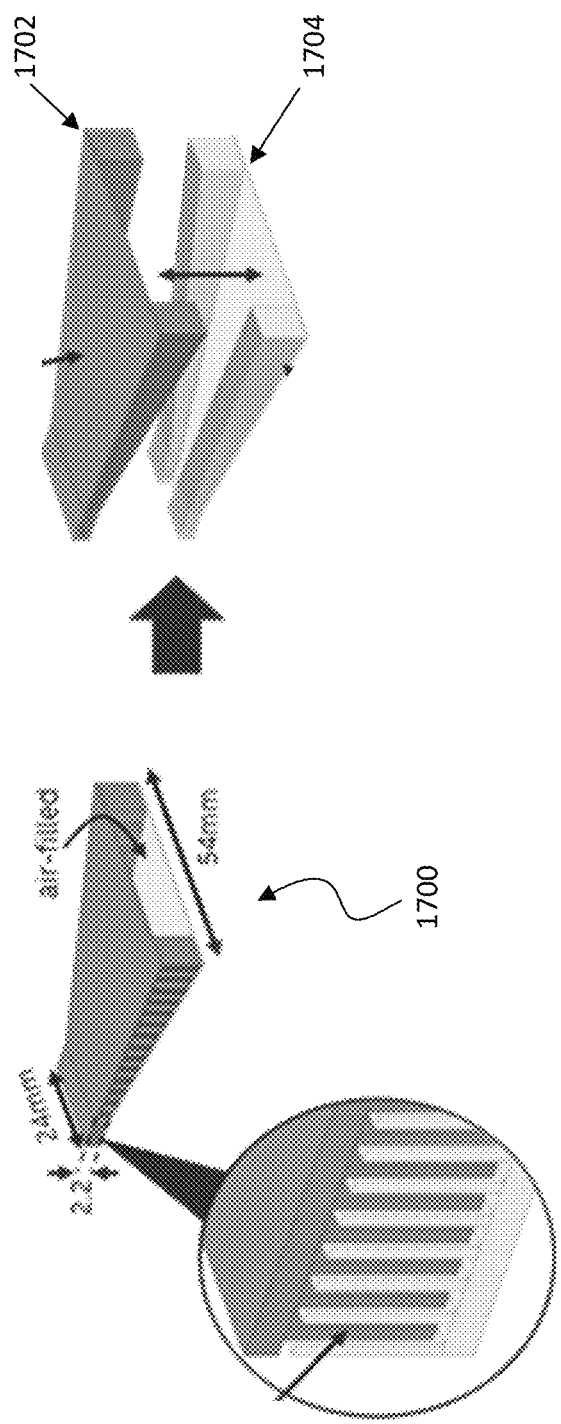
FIG. 17 depicts the waveguide as disclosed herein, configured as a horn antenna structure.

FIG. 17 depicts the waveguide as disclosed herein, configured as a horn antenna structure 1700. The waveguide disclosed herein can be modified to achieve many classical waveguide antennas, such as for example, but not limited to, open-ended waveguide antennas, horn antennas, and waveguide slot antennas. The horn antenna configuration as depicted in FIG. 17 includes a first waveguide unit 1702 and a second waveguide unit 1704, that are generally wedge-shaped, such that a height of the waveguide unit increases from one end to the next. Otherwise stated, the waveguide unit may be characterized by a first end and a second end opposite the first end, wherein a height of the waveguide unit increases from the first end to the second end. According to another aspect of the disclosure, the waveguide units may be shaped such that a width of the waveguide also increase from the first end to the second end. These waveguide units may include protrusions as otherwise described herein. Alternatively or additionally, the waveguide units may include generally vertical protrusions along the sides from the first end to the second end, thereby leaving a hollow space in the middle, said hollow space expanding both laterally and in height between the first end and the second end. When two such waveguide units are assembled, they may form a horn shape, as depicted herein.

Figure 18:
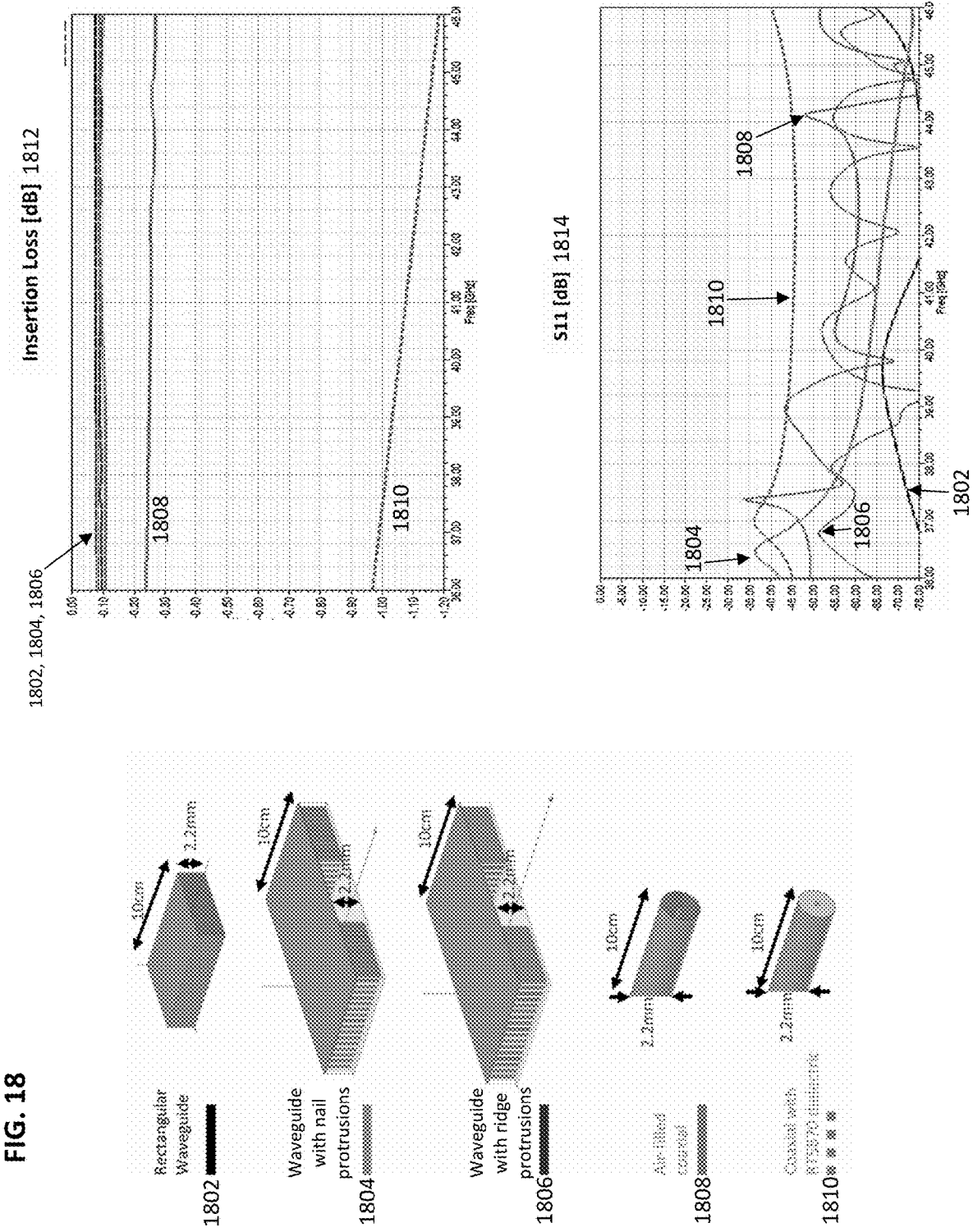
FIG. 18 compares the simulated performance of the waveguides disclosed herein with those of a typical rectangular waveguide and co-axial lines from 36-48 GHz.

FIG. 18 compares the simulated performance of the waveguides disclosed herein with those of a typical rectangular waveguide and co-axial lines from 36-48 GHz. Simulations indicate that return loss and S11 (dB) are both within acceptable levels (below 35 dB in the band shown). Insertion loss is close to the conventional metal waveguides and significantly improved compared to coaxial cables. The results are depicted with respect to a conventional rectangular waveguide 1802, a waveguide with nails as disclosed herein 1804, a waveguide with ridges as disclosed herein 1806, an air-filled coaxial cable 1808, and a coaxial cable with RT 5870 dielectric 1810. With respect to the insertion loss diagram 1812, the results of the conventional rectangular waveguide 1802, the waveguide with nails as disclosed herein 1804, and the waveguide with ridges 1806 as disclosed herein are so similar as to be virtually indistinguishable upon reproduction of the figure and therefore will be grouped together. The insertion loss of the air-filled coaxial 1808 and the coaxial with RT5870 dielectric 1810 are further depicted.

Further in FIG. 18, the S11 dB diagram 1814 depicts the results of the conventional rectangular waveguide 1802, the waveguide with nails 1804, the waveguide with ridges 1806, the air-filled coaxial 1808 and the coaxial with RT5870 dielectric 1810.

Figure 19:
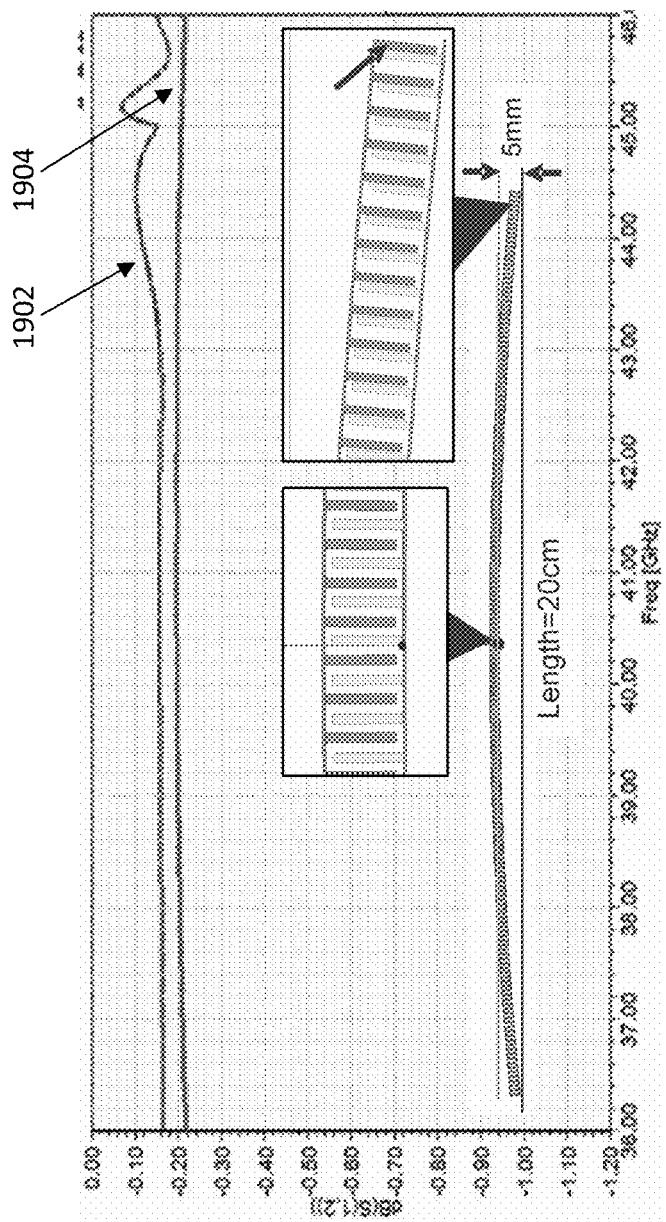
FIG. 19 depicts the flexion of the waveguide as disclosed herein, as well as a comparison of waveguide performance under flexion.

FIG. 19 depicts the flexion of the waveguide as disclosed herein, as well as a comparison of waveguide performance under flexion. In this figure, the performance of a conventional, solid waveguide, 20 cm long, and 2.2 mm thick is depicted as 1902. The performance of a flexible waveguide according to this disclosure, 20 cm long, and 2.2 mm thick, is depicted as 1904. As can be seen, the flexible waveguide can be bent without a significant change in performance, whereas bending a conventional waveguide results in performance loss. Furthermore, and as can be seen from this figure, the flexibility of the waveguide arises from the distances between the protrusions and/or the overall flexibility of the substrate. Whereas a conventional waveguide is generally constructed to be ridged and thus essentially incapable of flexion, this waveguide can be flexed to accommodate curves or bends in a given installation. The tests results in FIG. 19 show that a 20 cm waveguide configured as a flexible waveguide as disclosed herein was able to be flexed 5 mm.

Figure 20:
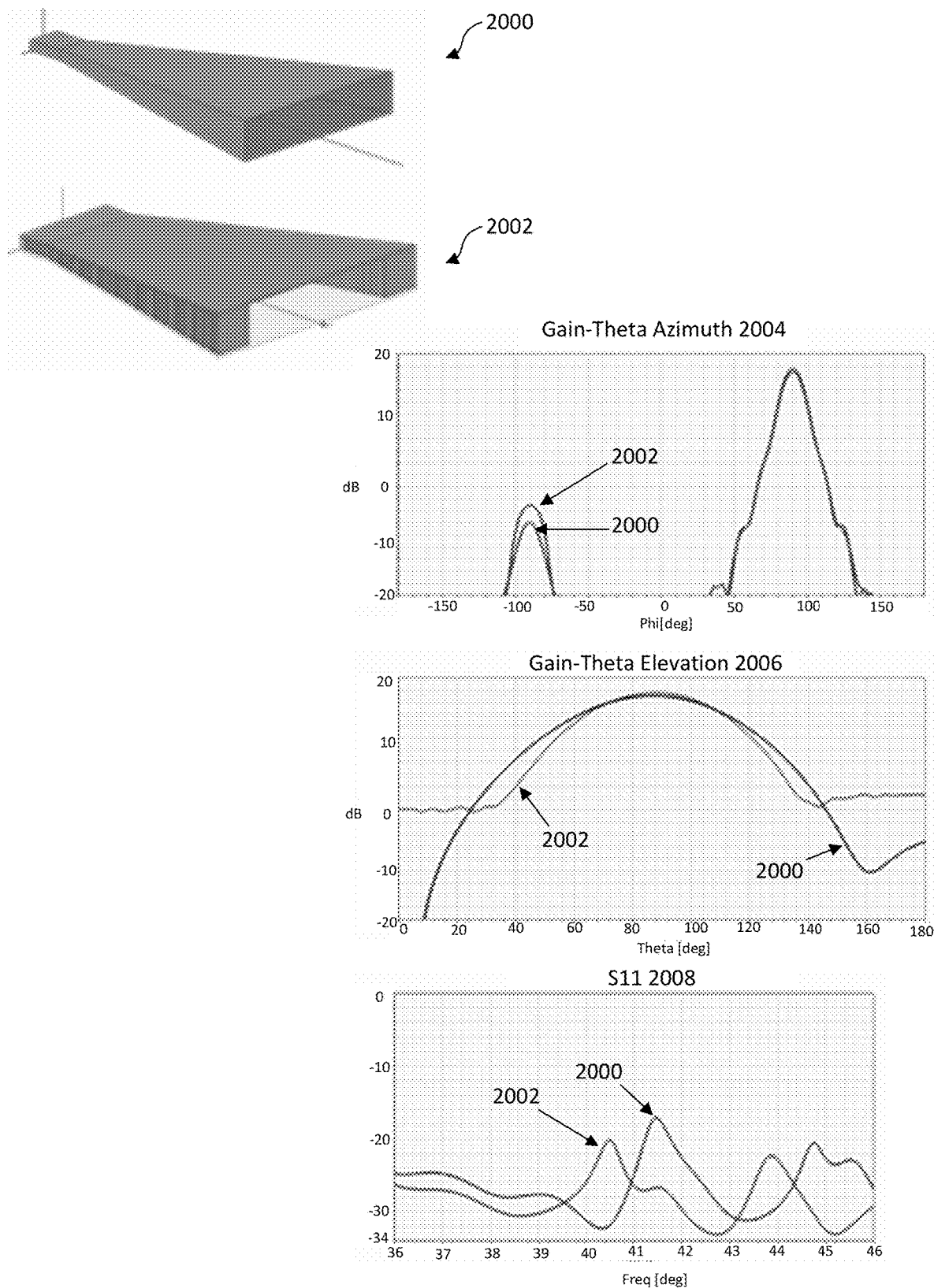
FIG. 20 depicts a comparison of the performance of a conventional horn-type antenna 2000 compared to a horn antenna according to the disclosure 2002.

FIG. 20 depicts a comparison of the performance of a conventional horn-type antenna 2000 compared to a horn antenna according to the disclosure 2002. As can be seen in diagram 2004, the conventional horn-type antenna 2000 and horn antenna according to the disclosure 2002 have similar gain and pattern at the horizontal plane. In the higher degree range (shown by the curves on the right), the results for the conventional horn-type antenna 2000 and horn antenna according to the disclosure 2002 were so similar as to be indistinguishable on the graph. As shown in diagram 2006, the conventional horn-type antenna 2000 and horn antenna according to the disclosure 2002 had similar peak gain, and the horn antenna according to the disclosure 2002 had a wider beam pattern at elevation. As shown in diagram 2008, the conventional horn-type antenna 2000 and horn antenna according to the disclosure 2002 had similar bandwidth.

As described herein, the waveguide units may be configured such that, when they are assembled, the space between the protrusions enables a certain degree of flexibility so that the waveguide can conform to a curved surface. Nevertheless, friction between protrusions of the first waveguide unit and the second waveguide unit will provide mechanical stability to the overall waveguide essentially enabling a new type of "snap assembly".

The waveguide may be understood based on its "distributed capacitive effect." In this manner, small spacing between the interlacing top and bottom protrusion presents a distributed capacitive effect that essentially creates a conducting wall, shorting top and bottom plates at certain frequencies. This departs drastically from the principle of operation of classical waveguides with solid walls. This waveguide is also fundamentally different from "gap waveguides" that utilize single bed of nails and a solid top face separated by a gap because "gap waveguides" essentially create a magnetic conducting interface for blocking propagation into the bed of nails, without the features of the waveguide disclosed herein, such as conformability and "snap assembly".

The waveguide as disclosed herein may include beds of interlacing, conducting protrusions with a channel (the inner section) to create a lowloss and conformable waveguide. When interlaced, the protrusions provide stability by offering a measure of rigidity and by creating friction to connect the first waveguide unit and the second waveguide unit (the friction arising from the protrusions of the first waveguide unit and the second waveguide unit that make physical contact with one another). Small spacing between protrusions emulates a conducting wall at a given frequency band and enables the structure to bend to conform to curved profiles.

The simultaneous use of DC or low-speed lines and microwaves is required in some applications. For example, in installations in which it is required to distribute reconfigurable or switchable antennas around a vehicle and connect them to centralized radio circuitry, it is required to run low-loss microwave interconnects along with DC or low speed lines for supplying power and control signals. Conventionally, a separate waveguide and shielded lines are used in these scenarios. Such shielded lines typically include shielded twisted pairs. The waveguide disclosed herein, in contrast, enables a new kind of "wiring harness" that bundles together DC or low-speed lines with low loss microwave waveguides into a single structure or "harness". Otherwise stated, the waveguide disclosed herein can be used to "shield" DC lines (or low speed twisted pair data lines) and bundle them with low loss microwave waveguides to enable a new kind of wiring harness interconnects. Although the housing lines (receptacle areas) for the DC lines are depicted herein as being straight, said housing lines can alternatively or additionally be designed in non-straight paths as needed (e.g., slanted, diagonal, curved, etc.)

Using the methods and principles described herein, a new construction method for many classical waveguide antennas is possible. Examples include open-ended waveguide antennas, horn antennas, and waveguide slot antennas. This can be seen in greater detail with respect to the horn antenna described herein. That is, by tapering the bed of protrusions vertically and horizontally, a horn antenna structure results. This antenna can be assembled by just manually joining both top and bottom structures ("snap assembly") while retaining flexibility to conform to curved profiles.

Turning to the issue of manufacturing, the waveguides disclosed herein may be manufactured, according to an aspect of the disclosure, using commercially available automotive-grade ultra-low-cost plastic materials and high-volume manufacturing (HVM) processes. To the extent that the waveguides/protrusions are manufactured using plastics, it is anticipated that they may be metalized to achieve the desired distributed capacitive effect.

Although the protrusions may be any size without limitation, certain sizes will be more suitable for certain manufacturing processes. According to one aspect of the disclosure, protrusion width can be as low as 0.25 mm for some mmW applications and still maintain the ability to be manufactured as indicated above. The resulting flexibility of the protrusions, and thereby of the waveguide, may be particularly useful for conforming to curved profiles, such as, for example, automotive platforms. Furthermore, manufacturing using low-cost plastics results low cost waveguides that can be commercially realized in high-volume manufacturing processes.

Additionally or alternatively, metallized silicone rubber processes are commercially available and can satisfy all of the requirements for the waveguides described herein (low cost, low weight, commercially-viable reproduction, etc.). Metallized silicone rubber can be dimensioned within the expected minimum 0.25 mm, and it can handle mass production of soft to medium soft structures that are suitable for automotive applications. After the protrusions are injection molded, the resulting structure can be metallized with known procedures.

The waveguide may include a first waveguide unit, including a first substrate, a plurality of protrusions extending from a surface of the first substrate; and a second waveguide unit, including: a second substrate and a plurality of protrusions extending from a surface the second substrate; wherein the first waveguide unit is configured to be assembled with the second waveguide unit such that at least a subset of the plurality of protrusions extending from the surface of the first substrate are placed between and substantially parallel to the plurality of protrusions extending from the surface of the second substrate.

The protrusions as described herein may be characterized as portions of the waveguide that extend away from the substrate of the waveguide unit, roughly perpendicular to the substrate. They may be in any form whatsoever, including, but not limited to, nail-like protrusions, finger-like protrusions, ridges, lines, or any other shape. The protrusions of the first waveguide unit and the second waveguide unit may be configured to interleave with one another when assembled. Such interleaving may include, but is not limited to, the protrusions of the first waveguide unit and the second waveguide unit alternating within the assembled waveguide unit, wherein some protrusions of the first waveguide unit make physical contact with at least one protrusion of the second waveguide unit, and wherein some protrusions of the first waveguide unit make no physical contact with any protrusions of the second waveguide unit.

The description of the protrusions as being arranged approximately perpendicular to the substrate of the waveguide unit is used herein to provide a general description of the arrangement of protrusions to substrate; however, the use of the word "perpendicular" should be understood broadly so as to include a variety of other angles greater than or less than a 90° relationship between the substrate and the protrusions. For example, the protrusions of the first waveguide unit and the second waveguide unit may be configured complementarily at approximately 45° (or any other angle), such that the waveguide units are no longer assembled by pressing a top waveguide unit and bottom waveguide unit together, but by sliding them together at an angle.

For the protrusions of the first waveguide unit that do not make contact with any protrusions of the second waveguide unit, it is anticipated that a capacitance will be generated between adjacent but not physically connected protrusions. That is, it is anticipated that a voltage will be applied to the first waveguide unit and the second waveguide unit, said voltage resulting in capacitance between adjacent, non-connecting protrusions. Assuming that the voltage applied to the waveguide is stable or unchanging, little or no current would be expected to flow as a result of the capacitance between adjacent, non-touching protrusions. The voltage may be applied across the waveguide using any known electrical connection technique, without limitation.

The first waveguide unit and second waveguide unit may include metal. According to one aspect of the disclosure, the first waveguide unit and the second waveguide unit may be made of metal. According to another aspect of the disclosure, the first waveguide unit and second waveguide unit may be made of a non-metal material and be coated with metal. According to another aspect of the disclosure, the first waveguide unit and the second waveguide unit may include metallized rubber or plastic. In the event that the first waveguide unit and second waveguide unit are metallized, the metal may be applied to the underlying material or materials using any known method, without limitation.

According to another aspect of the disclosure, the first waveguide unit and second waveguide unit may be divided into a number of regions, characterized by the presence of protrusions, and absence of protrusions, or a length of protrusions differing from a length in an adjacent region. For example, the waveguide units may include three regions: two outer regions characterized by the presence of protrusions, and an inner region, between the two outer regions, characterized by the absence of protrusions or a length of protrusions that a shorter than a length of the two outer regions. When a first waveguide unit and second waveguide unit, each having the two outer regions and one inner region, are fit together, the resulting waveguide may include a hollow space running along a length of the waveguide unit. The wave to be guided by the waveguide may travel through this hollow space. The configuration of regions is not limited to two outer regions and an inner region, but may be configured to include any number of hollow spaces for transmission or guidance of waves or cable shielding, as desired for the given implementation.

As stated above, it is anticipated that some protrusions of the first waveguide unit will make physical contact with at least one protrusion of the second waveguide unit. The physical connection between protrusions of opposite waveguide units may result in friction, which may assist in holding the waveguide unit in an assembled state. According to one aspect of the disclosure, the friction created by contacting protrusions from opposing waveguide units may obviate the need for an additional clip or fastener to hold the waveguide units together. According to another aspect of the disclosure, said friction may supplement a clip or fastener to maintain connection between the first waveguide unit and the second waveguide unit.

According to another aspect of the disclosure, the substrate and/or the protrusions of the one or more waveguide units may be flexible and/or elastic. The nature and properties of materials used for the waveguide disclosed herein may render the waveguide at least somewhat flexible and/or elastic. In this manner, the waveguide may be flexed or bent to accommodate curved or otherwise nonlinear spaces.

A flexion of the waveguide may determine a number of protrusions of the first waveguide unit that make physical contact with at least one protrusion of the second waveguide unit, and that a number of protrusions of the first waveguide unit that make no physical contact with any protrusions of the second waveguide unit. That is, when the substrates of the waveguide unit are flexed, the protrusions, which may have been parallel to one another in a non-flexed state, may change their angle relative to one another and no longer maintain a parallel arrangement with respect to one another. As such, any protrusion on the first waveguide unit may make physical contact with fewer or more protrusions in the second waveguide unit, based on a degree of flexion.

Although the waveguide is generally described herein as including two separate waveguide units which can be assembled together, the waveguide units may instead be attached in a manner that provides for assembly. For example, depending on the length and/or configuration of the protrusions, the two waveguides may be connected together, such that they may be folded together (e.g., having a flexible connector along the sides of the first waveguide unit and the second waveguide unit).

Under certain degrees of flexion (ranging from no flexion to complete flexion), the protrusions of the first waveguide unit may make no physical contact with any protrusions of the second waveguide unit. Conversely, under certain degrees of flexion, each protrusion of the first waveguide unit may make physical contact with at least one protrusion of the second waveguide unit.

The following examples pertain to further embodiments.

In Example 1, a circuitry is disclosed, including a sensor configured to detect an electrical signal indicating whether a low-noise amplifier in an antenna front end is active or not active; and one or more processors, configured to send an operational mode switching signal to control to the antenna front end to activate or deactivate the low-noise amplifier in an antenna front end; and control the antenna front end to receive or transmit data depending on the indication of the detected electrical signal.

In Example 2, the circuitry of Example 1 is disclosed, wherein the sending of the operational mode switching signal controls the antenna front end to deactivate the low-noise amplifier in the antenna front end.

In Example 3, the circuitry of Example 2 is disclosed, wherein the sensor is configured to detect via the electrical signal the deactivation of the low-noise amplifier, and wherein the one or more processors are further configured to control the antenna front end to transmit data based on the detected deactivation of the low-noise amplifier.

In Example 4, the circuitry of Example 1 is disclosed, wherein the one or more processors are further configured to control the antenna front end to activate the low-noise amplifier in the antenna front end by pausing the sending of the operational mode switching signal.

In Example 5, the circuitry of Example 4 is disclosed, wherein the sensor is configured to detect via the electric signal the activation of the low-noise amplifier, and wherein the one or more processors are further configured to control the antenna front end to receive data based on the detected activation of the low-noise amplifier.

In Example 6, the circuitry of any one of Examples 1 to 5 is disclosed, further including one or more second switches, configured to selectively electrically connect either a low noise amplifier of the radio frequency front end or a power amplifier of the radio frequency front end to the antenna front end.

In Example 7, the circuitry of Example 6 is disclosed, wherein the one or more processors are further configured to control the one or more second switches to selectively electrically connect the low noise amplifier to the antenna front end when controlling the antenna front end to receive data.

In Example 8, the circuitry of Example 6 or 7 is disclosed, wherein the one or more processors are further configured to control the one or more second switches to selectively electrically connect the power amplifier to the antenna front end when controlling the antenna front end to transmit data.

In Example 9, the circuitry of any one of Examples 6 to 8 is disclosed, wherein the one or more second switches are pulled up or pulled down to a default operational mode in which the antenna front end is controlled to receive data.

In Example 10, the circuitry of any one of Examples 6 to 8 is disclosed, wherein the one or more second switches are pulled up or pulled down to a default operational mode in which the antenna front end is controlled to transmit data.

In Example 11, the circuitry of any one of Examples 1 to 10 is disclosed, wherein the circuitry is connected to the antenna front end via a single cable.

In Example 12, the circuitry of Example 11 is disclosed, wherein the single cable is a coaxial cable.

In Example 13, a circuitry is disclosed, including a sensor, configured to detect an electrical signal indicating a transition of a radio frequency front end between transmit mode and receive mode; and one or more switches, configured to selectively connect or disconnect a low noise amplifier in an electrically conductive connection between an antenna and the radio frequency front end, depending on the indication of the transition between transmit mode and receive mode.

In Example 14, the circuitry of Example 13 is disclosed, wherein the one or more switches are configured to disconnect the low noise amplifier from the electrically conductive connection between the antenna and the radio frequency front end when the electrical signal is detected.

In Example 15, the circuitry of Example 13 or 14 is disclosed, wherein the one or more switches are configured to connect the low noise amplifier to the electrically conductive connection between the antenna and the radio frequency front end when the electrical signal is not detected.

In Example 16, the circuitry of any one of Examples 13 to 15 is disclosed, wherein the circuitry is electrically conductively connected to the radio frequency front end via a single cable.

In Example 17, the circuitry of Example 16 is disclosed, wherein the single cable is a coaxial cable.

In Example 18, a method of duplexing is disclosed, including: detecting an electrical signal indicating whether a low-noise amplifier in an antenna front end is active or not active; sending an operational mode switching signal to control to the antenna front end to activate or deactivate the low-noise amplifier in an antenna front end; and controlling the antenna front end to receive or transmit data depending on the indication of the detected electrical signal.

In Example 19, the method of duplexing of Example 18 is disclosed, wherein the sending of the operational mode switching signal controls the antenna front end to deactivate the low-noise amplifier in the antenna front end.

In Example 20, the method of duplexing of Example 18 or 19 is disclosed, further including determining via the detected electrical signal the deactivation of the low-noise amplifier, and controlling the antenna front end to transmit data based on the detected deactivation of the low-noise amplifier.

In Example 21, the method of duplexing of any one of Examples 18 to 20 is disclosed, wherein pausing the sending of the operational mode switching signal controls the antenna front end to activate the low-noise amplifier in the antenna front end.

In Example 22, the method of duplexing of Example 21 is disclosed, further including detecting via the electrical signal the activation of the low-noise amplifier, and controlling the antenna front end to receive data based on the detected activation of the low-noise amplifier.

In Example 23, the method of duplexing of any one of Examples 18 to 22 is disclosed, further including selectively electrically connecting either a low noise amplifier of the radio frequency front end or a power amplifier of the radio frequency front end to the antenna front end.

In Example 24, the method of duplexing of Example 23 is disclosed, further including selectively electrically connecting the low noise amplifier to the antenna front end when controlling the antenna front end to receive data.

In Example 25, the method of duplexing of Example 23 or 24 is disclosed, further including selectively electrically connecting the power amplifier to the antenna front end when controlling the antenna front end to transmit data.

In Example 26, the method of duplexing of any one of Examples 1 to 25 is disclosed, wherein the circuitry is connected to the antenna front end via a single cable.

In Example 27, the method of duplexing of Example 26 is disclosed, wherein the single cable is a coaxial cable.

In Example 28, a method of duplexing is disclosed, including detecting an electrical signal indicating a transition of a radio frequency front end between transmit mode and receive mode; and selectively connecting or disconnecting a low noise amplifier in an electrically conductive connection between an antenna and the radio frequency front end, depending on the indication of the transition between transmit mode and receive mode.

In Example 29, the method of duplexing of Example 28 is disclosed, further including disconnecting the low noise amplifier from the electrically conductive connection between the antenna and the radio frequency front end when the electrical signal is detected.

In Example 30, the method of duplexing of Example 28 or 29 is disclosed, further including connecting the low noise amplifier to the electrically conductive connection between the antenna and the radio frequency front end when the electrical signal is not detected.

In Example 31, the method of duplexing of any one of Examples 28 to 30 is disclosed, wherein the circuitry is electrically conductively connected to the radio frequency front end via a single cable.

In Example 32, the method of duplexing of Example 31 is disclosed, wherein the single cable is a coaxial cable.

In Example 33, a duplexing system is disclosed, including: a radio frequency front end including: one or more processors, configured to send an operational mode switching signal; and an antenna front end, electrically conductively connected to the radio frequency front end, the antenna front end including: a second sensor, configured to detect the operational mode switching signal and to output a second sensor output representing a detection of the operational mode switching signal; and one or more switches, configured to selectively connect or disconnect a low noise amplifier in an electrically conductive connection between an antenna of the antenna front end and the radio frequency front end, based on the second sensor output.

In Example 34, the duplexing system of Example 33 is disclosed, wherein the radio frequency front end further includes a first sensor; and wherein the first sensor is configured to detect a change in current drawn by an antenna front end due to the low noise amplifier being selectively disconnected, and to output a first sensor output representing the detected change in current.

In Example 35, the duplexing system of Example 34 is disclosed, wherein the one or more processors are further configured to change from a first operational mode to a second operational mode based on the first sensor output.

In Example 36, the duplexing system of any one of Examples 33 to 35 is disclosed, wherein the radio frequency front end and the antenna front end are configured to operate according to either a first operational mode or a second operational mode.

In Example 37, the duplexing system of any one of Example 36 is disclosed, wherein the first operational mode is a receive mode, and wherein the second operational mode is a transmit mode.

In Example 38, the duplexing system of any one of Examples 33 to 37 is disclosed, wherein the sending of the operational mode switching signal by the one or more processors switches the radio frequency front end and the antenna front end from the first operational mode to the second operational mode.

In Example 39, the duplexing system of any one of Examples 33 to 38 is disclosed, wherein pausing the sending of the operational mode switching signal switches the radio frequency front end and the antenna front end from the second operational mode to the first operational mode.

In Example 40, the duplexing system of any one of Examples 33 to 39 is disclosed, wherein the radio frequency front end and the antenna front end switch from the first operational mode to the second operational mode by: sending the operational mode switching signal from the one or more processors to the antenna front end via the electrical connection; detecting the operational mode switching signal by the power detector of the antenna front end; selectively disconnecting the second low noise amplifier from the electrically conductive connection between an antenna of the antenna front end and the radio frequency front end by the one or more second switches; detecting by the current sensing unit a change in current drawn by the antenna front end based on disconnection of the second low noise amplifier; and receiving by the one or more processors a signal representing an output of the current sensing circuit.

In Example 41, the duplexing system of any one of Examples 33 to 40 is disclosed, wherein the radio frequency front end further includes one or more second switches, configured to selectively electrically connect either a low noise amplifier of the radio frequency front end or a power amplifier of the radio frequency front end to the antenna front end.

In Example 42, the duplexing system of Example 41 is disclosed, wherein the one or more processors control the one or more second switches to selectively electrically connect the low noise amplifier to the antenna front end to enter a first operational mode.

In Example 43, the duplexing system of Example 41 or 42 is disclosed, wherein the one or more processors control the one or more second switches to selectively electrically connect the power amplifier to the antenna front end to enter a second operational mode.

In Example 44, the duplexing system of any one of Examples 41 to 43 is disclosed, wherein the one or more second switches are pulled up or pulled down to default to the first operational mode.

In Example 45, the duplexing system of any one of Examples 41 to 43 is disclosed, wherein the one or more second switches are pulled up or pulled down to default to the second operational mode.

In Example 46, the duplexing system of any one of Examples 33 to 44 is disclosed, wherein the one or more processors are configured to switch the radio frequency front end and the antenna front end from the second operational mode to the first operational mode by pausing the sending of the operational mode switching signal.

In Example 47, the duplexing system of any one of Examples 33 to 45 is disclosed, wherein the electrical conductive connection between the radio frequency front end and the antenna front end is a single cable.

In Example 48, the duplexing system of Example 46 is disclosed, wherein the single cable is a coaxial cable.

In Example 49, one or more processors is disclosed, configured to: output an operational mode switching signal; receive a signal representing a detected reduction of current drawn by an antenna front end; and control a radio frequency front end to change from a first operational mode to a second operational mode as a result of the outputting of the operational mode switching signal and the receiving of the signal representing the detected reduction of current.

In Example 50, the one or more processors of Example 49 is disclosed, wherein the second operational mode is a transmission mode.

In Example 51, the one or more processors of Example 49 or 50 is disclosed, wherein controlling a radio frequency front end to operate according to a second operational mode further includes sending a signal to an antenna front end for transmission by an antenna.

In Example 52, the one or more processors of any one of Examples 49 to 51 is disclosed, further including controlling a second switch to decouple a low noise amplifier in a radio frequency front end from an antenna in an antenna front end, and to selectively couple a power amplifier in the radio frequency front end to the antenna in an antenna front end.

In Example 53, the one or more processors of any one of Examples 49 to 52 is disclosed, wherein the one or more processors are further configured to control the radio frequency front end to operate according to a first operational mode by pausing the sending of the operational mode switching signal.

In Example 54, the one or more processors of any one of Examples 49 to 53 is disclosed, wherein the one or more processors are further configured to control the radio frequency front end to receive a signal from the antenna in the antenna front end.

In Example 55, a method of duplexing is disclosed, including: send an operational mode switching signal from a radio frequency front end to an antenna front end; detecting in the antenna front end the operational mode switching signal; and disconnecting a low noise amplifier from an electrically conductive connection between an antenna of the antenna front end and the radio frequency front end, based on the detected operational mode switching signal.

In Example 56, the method of duplexing of Example 55 is disclosed, further including detecting in the radio frequency front end a change in current drawn by the antenna front end due to the low noise amplifier being selectively disconnected.

In Example 57, the method of duplexing of Example 56 is disclosed, further including changing from a first operational mode to a second operational mode based on the detected change in current.

In Example 58, the method of duplexing of any one of Examples 55 to 57 is disclosed, wherein the radio frequency front end and the antenna front end are configured to operate according to either a first operational mode or a second operational mode.

In Example 59, the method of duplexing of any one of Example 58 is disclosed, wherein the first operational mode is a receive mode, and wherein the second operational mode is a transmit mode.

In Example 60, the method of duplexing of any one of Examples 55 to 59 is disclosed, wherein the sending of the operational mode switching signal by the one or more processors switches the radio frequency front end and the antenna front end from the first operational mode to the second operational mode.

In Example 61, the method of duplexing of any one of Examples 55 to 60 is disclosed, further including switching the radio frequency front end and the antenna front end from the second operational mode to the first operational mode by pausing the sending of the operational mode switching signal.

In Example 62, the method of duplexing of any one of Examples 55 to 61 is disclosed, further including switching from the first operational mode to the second operational mode by: sending the operational mode switching signal from the one or more processors to the antenna front end via the electrical connection; detecting the operational mode switching signal by the power detector of the antenna front end; selectively disconnecting the second low noise amplifier from the electrically conductive connection between an antenna of the antenna front end and the radio frequency front end by the one or more second switches; detecting by the current sensing unit a change in current drawn by the antenna front end based on disconnection of the second low noise amplifier; and receiving by the one or more processors of a signal representing an output of the current sensing circuit.

In Example 63, the method of duplexing of any one of Examples 55 to 62 is disclosed, further including selectively electrically connecting either a low noise amplifier of the radio frequency front end or a power amplifier of the radio frequency front end to the antenna front end.

In Example 64, the method of duplexing of Example 63 is disclosed, further including controlling the one or more second switches to selectively electrically connect the low noise amplifier to the antenna front end to enter a first operational mode.

In Example 65, the method of duplexing of Example 63 or 64 is disclosed, further including controlling the one or more second switches to selectively electrically connect the power amplifier to the antenna front end to enter a second operational mode.

In Example 66, the method of duplexing of any one of Examples 55 to 65 is disclosed, further including switching the radio frequency front end and the antenna front end from the second operational mode to the first operational mode by pausing the sending of the operational mode switching signal.

In Example 67, the method of duplexing of any one of Examples 55 to 66 is disclosed, wherein the electrical conductive connection between the radio frequency front end and the antenna front end is a single cable.

In Example 68, the method of duplexing of Example 67 is disclosed, wherein the single cable is a coaxial cable.

In Example 69, a waveguide is disclosed, including a first waveguide unit, including: a first substrate, a plurality of protrusions extending from a surface of the first substrate; a second waveguide unit, including: a second substrate a plurality of protrusions extending from a surface the second substrate; wherein the first waveguide unit is configured to be assembled with the second waveguide unit such that at least a subset of the plurality of protrusions extending from the surface of the first substrate are placed between and substantially parallel to the plurality of protrusions extending from the surface of the second substrate.

In Example 70, the waveguide of Example 69 is disclosed, wherein the plurality of protrusions extending from the surface of the first substrate and the plurality of protrusions extending from the surface of the first substrate substantially interleave one another when the waveguide is assembled.

In Example 71, the waveguide of Example 69 or 70 is disclosed, wherein the waveguide is configured to generate a capacitance between one or more of the protrusions extending from the surface the first substrate and one or more of the protrusions extending from the surface the second substrate, respectively.

In Example 72, the waveguide of any one of Examples 69 to 71 is disclosed, wherein the plurality of protrusions extending from the surface of the first substrate and the plurality of protrusions extending from the surface of the second substrate include metal.

In Example 73, the waveguide of any one of Examples 69 to 72 is disclosed, wherein the plurality of protrusions extending from the surface of the first substrate and the plurality of protrusions extending from the surface of the first substrate include metalized rubber.

In Example 74, the waveguide of any one of Examples 69 to 73 is disclosed, wherein the surface of the first substrate includes a first outer region, a second outer region, and an inner region between the first outer region and the second outer region, and wherein the plurality of protrusions extend from the first outer region and the second outer region but not from the inner region.

In Example 75, the waveguide of any one of Examples 69 to 74 is disclosed, wherein the surface of the first substrate includes a first outer region, a second outer region, and an inner region between the first outer region and the second outer region, and wherein the plurality of protrusions extend from the first outer region and the second outer region, and wherein any protrusions extending from the inner region are shorter than the protrusions extending from the first region and the protrusions extending from the second region.

In Example 76, the waveguide of Example 75 is disclosed, wherein the protrusions extending from the first region and the protrusions extending from the second region of each of the first substrate and the second substrate are characterized by a length extending away from the surface of the first substrate and the second substrate, respectively, the length being greater than a width of the protrusions.

In Example 77, the waveguide of any one of Examples 69 to 76 is disclosed, wherein the protrusions extending from the first region and the protrusions extending from the second region of each of the first substrate and the second substrate are substantially nail shaped.

In Example 78, the waveguide of any one of Examples 69 to 77 is disclosed, wherein the protrusions extending from the first region and the protrusions extending from the second region of each of the first substrate and the second substrate are substantially ridge shaped.

In Example 79, the waveguide of any one of Examples 69 to 78 is disclosed, wherein, when the waveguide is assembled, a first portion of the plurality of protrusions extending from the surface of the first substrate make contact with one or more of the plurality of protrusions from the surface of the second substrate.

In Example 80, the waveguide of any one of Examples 69 to 79 is disclosed, wherein, when the waveguide is assembled, a second portion of the plurality of protrusions from the surface of the first substrate do not make contact with any of the plurality of protrusions from the surface of the second substrate.

In Example 81, the waveguide of any one of Examples 69 to 80 is disclosed, wherein the plurality of protrusions extending from the surface of the first substrate and the plurality of protrusions extending from the surface of the second substrate are configured such that contact between the first portion of the plurality of protrusions extending from the surface of the first substrate and the one or more of the plurality of protrusions from the surface of the second substrate generates sufficient friction to maintain an assembly of the first waveguide unit and the second waveguide unit.

In Example 82, the waveguide of any one of Examples 69 to 81 is disclosed, wherein the first substrate is flexible.

In Example 83, the waveguide of any one of Examples 69 to 82 is disclosed, wherein the second substrate is flexible.

In Example 84, the waveguide of any one of Examples 69 to 83 is disclosed, wherein the waveguide is configured to have a voltage applied across the first waveguide unit and the second waveguide unit.

In Example 85, the waveguide of any one of Examples 69 to 84 is disclosed, wherein the first waveguide unit further includes a first electrode and the second waveguide unit further includes a second electrode, and wherein the waveguide is configured to have a voltage applied across the first electrode and the second electrode.

In Example 86, a method of manufacturing a waveguide is disclosed, including forming a first waveguide unit, including: a first substrate, a plurality of protrusions extending from a surface of the first substrate; forming a second waveguide unit, including: a second substrate a plurality of protrusions extending from a surface the second substrate; wherein the first waveguide unit is configured to be assembled with the second waveguide unit such that at least a subset of the plurality of protrusions extending from the surface of the first substrate are placed between and substantially parallel to the plurality of protrusions extending from the surface of the second substrate.

In Example 87, the method of manufacturing a waveguide of Example 86 is disclosed, wherein the plurality of protrusions extending from the surface of the first substrate and the plurality of protrusions extending from the surface of the first substrate substantially interleave one another when the waveguide is assembled.

In Example 88, the method of manufacturing a waveguide of Example 86 or 87 is disclosed, wherein the waveguide is configured to generate a capacitance between one or more of the protrusions extending from the surface the second substrate and one or more of the protrusions extending from the surface the second substrate, respectively.

In Example 89, the method of manufacturing a waveguide of any one of Examples 86 to 88 is disclosed, wherein the plurality of protrusions extending from the surface of the first substrate and the plurality of protrusions extending from the surface of the second substrate include metal.

In Example 90, the method of manufacturing a waveguide of any one of Examples 86 to 89 is disclosed, wherein the plurality of protrusions extending from the surface of the first substrate and the plurality of protrusions extending from the surface of the first substrate include rubber.

In Example 91, the method of manufacturing a waveguide of Example 90 is disclosed, further including metalizing the rubber protrusions.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A system comprising:
an antenna front end;
a radio frequency front end; and
a single cable connection between the antenna front end and the radio frequency front end;
wherein the radio frequency front end comprises:
a current sensor configured to detect a current draw from the antenna front end, indicating whether a low-noise amplifier in the antenna front end is active or not active; and
one or more processors, configured to:
send an operational mode switching signal to control the antenna front end to activate or deactivate the low-noise amplifier in the antenna front end; and
control the antenna front end to receive or transmit data depending on the indication of the detected current draw.

2. The system of claim 1, wherein the sending of the operational mode switching signal controls the antenna front end to deactivate the low-noise amplifier in the antenna front end.

3. The system of claim 2, wherein the sensor is configured to detect via the current draw the deactivation of the low-noise amplifier, and wherein the one or more processors are further configured to control the antenna front end to transmit data based on the detected deactivation of the low-noise amplifier.

4. The system of claim 1, wherein the one or more processors are further configured to control the antenna front end to activate the low-noise amplifier in the antenna front end by pausing the sending of the operational mode switching signal.

5. The system of claim 4, wherein the sensor is configured to detect via the current draw the activation of the low-noise amplifier, and wherein the one or more processors are further configured to control the antenna front end to receive data based on the detected activation of the low-noise amplifier.

6. The system of claim 1, wherein the radio frequency front end comprises a first low-noise amplifier, configured to receive a first signal from an antenna of the antenna front end, to amplify the first signal, and to output the amplified first signal;
   wherein the antenna front-end comprises a second low-noise amplifier, configured to receive a second signal from the radio-frequency front end, amplify the second signal, and output the second signal to the antenna of the antenna front end for transmission;
      wherein the current sensor is configured to detect a current draw from the second low-noise amplifier of the antenna front end; and
      wherein the one or more processors are configured to control the antenna front end to receive or transmit data depending on whether the current sensor detected the current draw from the low-noise amplifier.

7. The system of claim 1, wherein the detected current draw is the detected current draw from the antenna front end.

8. A method of duplexing comprising:
   detecting via a current sensor in a radio frequency front end, electrically connected to an antenna front end via a single cable, a current draw from the antenna front end, indicating whether a low-noise amplifier in the antenna front end is active or not active;
   sending an operational mode switching signal to control the antenna front end to activate or deactivate the low-noise amplifier in the antenna front end; and
   controlling the antenna front end to receive or transmit data depending on the indication of the detected current draw.

9. The method of duplexing of claim 8, wherein the sending of the operational mode switching signal controls the antenna front end to deactivate the low-noise amplifier in the antenna front end.

10. The method of duplexing of claim 8, further comprising determining via the detected current draw the deactivation of the low-noise amplifier, and controlling the antenna front end to transmit data based on the detected deactivation of the low-noise amplifier.

11. The method of duplexing of claim 8, wherein pausing the sending of the operational mode switching signal controls the antenna front end to activate the low-noise amplifier in the antenna front end.

* * * * *